United States Patent [19]

Rider

[11] Patent Number: 5,264,795
[45] Date of Patent: Nov. 23, 1993

[54] SYSTEM TRANSMITTING AND RECEIVING DIGITAL AND ANALOG INFORMATION FOR USE IN LOCATING CONCEALED CONDUCTORS

[75] Inventor: Alan J. Rider, Reston, Va.

[73] Assignee: The Charles Machine Works, Inc., Perry, Okla.

[21] Appl. No.: 539,851

[22] Filed: Jun. 18, 1990

[51] Int. Cl.$^5$ .................. G01V 3/11; G01V 3/165; H04B 13/02

[52] U.S. Cl. .................. 324/326; 324/67; 455/40

[58] Field of Search .............. 324/66, 67, 326–329; 455/234, 239, 40

[56] References Cited

U.S. PATENT DOCUMENTS

| | | |
|---|---|---|
| 1,926,327 | 9/1933 | Burrell et al. . |
| 2,658,284 | 11/1949 | Arps . |
| 2,664,542 | 12/1953 | Lynn . |
| 2,908,863 | 10/1959 | Neff . |
| 2,992,325 | 7/1961 | Lehan . |
| 3,406,766 | 10/1968 | Henderson . |
| 3,465,834 | 9/1969 | Southworth, Jr. . |
| 3,529,682 | 9/1970 | Coyne et al. . |
| 3,589,454 | 6/1971 | Coyne . |
| 3,653,050 | 3/1972 | Eggleston, Jr. . |
| 3,712,391 | 1/1973 | Coyne . |
| 3,718,930 | 2/1973 | McCullough et al. . |
| 3,746,106 | 7/1973 | McCullough et al. . |
| 3,853,185 | 12/1974 | Dahl et al. . |
| 3,893,025 | 7/1975 | Humphreys, Jr. . |
| 3,900,878 | 8/1975 | Tsao . |
| 3,906,504 | 9/1975 | Guster et al. .......... 455/40 X |
| 3,907,045 | 9/1975 | Dahl et al. . |
| 3,967,282 | 6/1976 | Young et al. . |
| 4,006,445 | 2/1977 | Howell . |
| 4,070,625 | 1/1978 | Harpster .......... 324/67 X |
| 4,119,908 | 10/1978 | Cosman et al. .......... 324/67 X |
| 4,172,382 | 10/1979 | Murphy et al. . |
| 4,213,194 | 7/1980 | Spurlock et al. . |
| 4,227,405 | 10/1980 | West . |
| 4,245,353 | 1/1981 | Bynum .......... 455/234 |
| 4,258,322 | 3/1981 | Rocroi . |
| 4,313,218 | 1/1982 | O'Donnell, Jr. et al. .......... 455/239 |
| 4,372,398 | 2/1983 | Kuckes . |
| 4,387,340 | 6/1983 | Peterman . |
| 4,427,943 | 1/1984 | Cloutier et al. . |
| 4,438,820 | 3/1984 | Gibson . |

(List continued on next page.)

FOREIGN PATENT DOCUMENTS

| | | |
|---|---|---|
| 0246886 | 11/1987 | European Pat. Off. . |
| 0247799 | 12/1987 | European Pat. Off. . |
| 0262882 | 4/1988 | European Pat. Off. . |
| 0339825 | 11/1989 | European Pat. Off. . |
| 3615291A1 | 11/1986 | Fed. Rep. of Germany . |
| 3735585A1 | 4/1988 | Fed. Rep. of Germany . |
| 53-135671 | 11/1978 | Japan . |
| WO82/02777 | 8/1982 | PCT Int'l Appl. . |
| 1412399 | 1/1975 | United Kingdom . |
| 1412400 | 6/1976 | United Kingdom . |
| 1438864 | 5/1978 | United Kingdom . |
| 1509914 | 10/1980 | United Kingdom . |
| 1577742 | 10/1980 | United Kingdom . |
| 2116723A | 9/1983 | United Kingdom . |

*Primary Examiner*—Gerard R. Strecker
*Assistant Examiner*—Warren S. Edmonds
*Attorney, Agent, or Firm*—Richards, Medlock & Andrews

[57] ABSTRACT

An improved locator system is provided which transmits digital and analog information over an electromagnetic field that is radiating from an underground source. The locator system includes a transmitter that modulates its output signal by turning its output signal on and off in response to a sequence of digital words. The transmitter also modulates an analog signal onto the transmitted signal. The modulated analog signal can include an audio frequency or voice signal. The improved locator system also includes a receiver that senses and detects the transmitted digital or analog signal impressed on the radiated electromagnetic field. The receiver also demodulates the transmitted audio frequency signal and provides an audio output signal to an operator.

51 Claims, 17 Drawing Sheets

U.S. PATENT DOCUMENTS

| | | |
|---|---|---|
| 4,445,578 | 5/1984 | Millheim . |
| 4,452,075 | 6/1984 | Bockhorst et al. . |
| 4,458,204 | 7/1984 | Weber . |
| 4,479,254 | 10/1984 | Craiglow .............................. 455/239 |
| 4,491,785 | 1/1985 | Pecukonis .............................. 324/67 |
| 4,495,496 | 1/1985 | Miller . |
| 4,520,317 | 5/1985 | Peterman . |
| 4,542,344 | 9/1985 | Darilek et al. ....................... 324/326 |
| 4,580,288 | 4/1986 | Rinderle ............................... 455/239 |
| 4,593,559 | 6/1986 | Brown et al. . |
| 4,642,556 | 2/1987 | Pecukonis .............................. 324/67 |
| 4,652,861 | 3/1987 | Domes . |
| 4,672,321 | 6/1987 | Howell . |
| 4,674,579 | 6/1987 | Geller et al. . |
| 4,691,165 | 9/1987 | Szedlmajer . |
| 4,691,204 | 9/1987 | Hiramoto . |
| 4,700,142 | 10/1987 | Kuckes . |
| 4,709,213 | 11/1987 | Harpster ............................... 324/329 |
| 4,710,708 | 12/1987 | Rorden et al. . |
| 4,714,118 | 12/1987 | Baker et al. . |
| 4,714,888 | 12/1987 | French et al. . |
| 4,736,204 | 4/1988 | Davison . |
| 4,774,470 | 9/1988 | Takigawa . |
| 4,776,040 | 10/1988 | Ichikawa et al. ............... 455/234 X |
| 4,787,463 | 11/1988 | Geller et al. . |
| 4,791,373 | 12/1988 | Kuckes . |
| 4,800,385 | 1/1989 | Yamazaki . |
| 4,806,869 | 2/1989 | Chau et al. . |
| 4,864,293 | 9/1989 | Chau . |
| 4,867,255 | 9/1989 | Baker et al. . |
| 4,870,697 | 9/1989 | Weber ................................ 455/40 X |
| 4,875,014 | 10/1989 | Roberts et al. . |
| 4,881,083 | 11/1989 | Chau et al. . |

CHANNEL A

SYSTEM TRANSMITTING AND RECEIVING DIGITAL AND ANALOG INFORMATION FOR USE IN LOCATING CONCEALED CONDUCTORS

This application is related by subject matter to commonly assigned, copending applications U.S. Ser. No. 902,525, filed Jun. 22, 1992, which is a continuation application of U.S. Ser. No. 539,616, filed Jun. 18, 1990, now abandoned; U.S. Ser. No. 539,551, filed Jun. 18, 1990, now issued into U.S. Pat. No. 5,133,417; U.S. Ser. No. 837,110, filed Feb. 18, 1992, now issued into U.S. Pat. No. 5,174,033, which is a continuation application of U.S. Ser. No. 539,699, filed Jun. 18, 1990, now abandoned; and U.S. Ser. No. 539,552, filed Jun. 18, 1990.

TECHNICAL FIELD

The present invention generally relates to a system for use in determining the location and orientation of concealed underground objects and, more particularly, to an improved locator system which impresses an electromagnetic signal onto a concealed underground conductor to be radiated therefrom and/or radiates an electromagnetic signal from a subterranean transmitter, modulates information onto the radiated signal, and detects and processes the information with an aboveground receiver.

BACKGROUND OF THE INVENTION

A variety of devices are used to determine the location and orientation of concealed underground objects. Determining the location of such concealed objects as underground gas, sewer and water pipes, power cables, and telephone and CATV cables or conduits is a necessary prerequisite to excavation and/or the laying of new lines, pipes or cables. For simplicity, these underground objects are hereinafter referred to as underground "lines."

In some applications, an underground steerable boring tool is utilized to form an underground tunnel through which underground lines are subsequently routed. Using a known boring technique, the path followed by the tool under the ground is determined by the orientation of the tool's cutting face. In order to steer the tool, an operator rotates a drill string that is connected to the tool until the cutting face is positioned to attain the desired steering direction. To help the operator steer the tool, a "roll sensor" that determines the angular orientation of the cutting face with respect to the tool's boring axis is installed in or behind the head of the tool. The roll angle data from the sensor is then relayed to the tool operator. The provision of roll angle data has been accomplished by a number of methods such as hard-wired signal transmissions from the boring tool to the operator, acoustic impulses representing roll angle data transmitted along the drill string, pulsation of drilling fluid, or simply by transferring a mark on the drill string. There are a number of problems with these and other conventional techniques, which are discussed in commonly-assigned, copending application Ser. No. 837,110, filed Feb. 18, 1992, now issued into U.S. Pat. No. 5,174,033, which is a continuation application of U.S. Ser. No. 539,699, filed Jun. 18, 1990, now abandoned, entitled "Angle Sensor For A Steerable Boring Tool", which is expressly incorporated herein by reference. These problems include cost, complexity, reliability, and the effects of vibration. However, as described in more detail below, the present invention solves this problem by encoding roll angle and/or pitch angle information onto the signal radiated from a small transmitter located in the boring tool and detecting the information with the same aboveground receiver used to locate and trace the boring tool.

While utilizing a steerable boring tool, it is important for an operator to trace or keep track of the relative location of the existing underground lines with respect to the boring tool, in order to avoid contacting the existing lines with the tool. In other applications, a trench is excavated and lines are subsequently placed in the open trench. While excavating these trenches, it is equally important for an operator to know the locations of any existing lines in order to avoid damaging them with the excavating equipment.

Special-purpose electromagnetic signal detector systems, which are commonly called "locator systems," have been used for many years to locate concealed underground lines, or more recently, to trace the path of a boring tool. Various types of locator systems exist, but receivers that detect electromagnetic signals radiating from either the underground lines or a small transmitter located within the boring tool are by far the most widely used. Such radiated signals are generally produced in two ways: (1) an alternating current signal from an aboveground transmitting source is induced into an underground conductive line which generates an electromagnetic field around the line, or (2) a signal is radiated from a small transmitter either mounted inside a boring tool or positioned within a non-conductive line.

Generally, two types of signal sources will induce a current in a conductive line which, in turn, will generate an electromagnetic field around the line: active signal sources and passive signal sources. An example of a passive signal source in a locating environment is the signal radiated from a very-low-frequency (VLF) radio broadcast station. When such a signal encounters a portion of a buried conductive line, the signal induces a current in the line, which generates an electromagnetic field around the line. Such a source is called a passive signal source, because it requires no operator intervention to generate the electromagnetic field. The problem with a passive signal source is that the same signal may be induced into many different lines, which complicates the operator's task of distinguishing between the different lines.

Conversely, an active signal source is intentionally utilized by an operator to generate an electromagnetic field directly associated with the object to be traced. For example, an operator may couple a signal having a known frequency to an underground cable, for the purpose of generating a distinct electromagnetic field around the cable. The presence of the distinct electromagnetic field allows the operator to locate the cable and distinguish it from other cables with an aboveground receiver. This ability to distinguish between the cables is a key advantage of an active signal source over a passive signal source. Another example of an active signal source is the small, subterranean transmitter which may be installed in a boring tool or passed through a hollow non-conductive line. A distinct signal radiated from the subterranean transmitter allows the operator to trace either the path of the boring tool or that of the non-conductive line. It is noted that the present invention deals only with the use of active signal sources.

As discussed above, a key advantage of an active signal source is the capability of coupling a distinctive frequency signal onto one conductive line, and distinguishing that particular line from adjacent or nearby lines. Consequently, the conductive line of interest can be traced with less confusion or interference from the adjacent lines. Since the frequency of the coupled signal can be controlled precisely, a narrow bandwidth can be used for greater selectivity in the receiver. Also, the use of a narrow bandwidth improves the signal-to-noise ratio and increases the sensitivity of the receiver. The use of a narrow bandwidth in a locator receiver can be especially important for locating conductive lines in the vicinity of a strong radio transmitter, where the airborne signal can swamp out a subterranean signal unless the airborne signal is filtered out by the receiver's selective, narrow-band circuitry. Another advantage of an active source is that locator calculations of the position and depth of underground conductive lines are not affected by electromagnetic field distortions from multiple signal sources to the same degree as they are with a passive signal source.

The most practical way to couple a signal to an underground conductive line is simply to attach a wire directly from the transmitter to the line. Such a technique is illustrated in U.S. Pat. No. 4,387,340 to Peterman. If this approach is not feasible, it may be possible to attach the transmitter wire to a toroidal clamp, which is placed around the circumference of the line in order to induce a signal current into the line. The signal induced into the line is then radiated from the line and detected with a locator receiver. Alternatively, if the signal cannot be readily coupled directly to the line because, for example, the line is completely buried, the signal can be coupled indirectly to the line by using a coil located in the transmitter and passing an alternating current signal through the coil. The electromagnetic field from the coil in the aboveground transmitter radiates through the earth and induces a current into the buried line. The signal induced into the line is then reradiated from the line and detected with a locator receiver.

As shown in Peterman, an active signal source is commonly used when an operator desires to locate and trace a specific underground line that is near numerous other lines. A distinctive frequency signal is coupled from a locator transmitter to the line to be traced. For example, the transmitter generates a signal at a specific frequency. A locator receiver is manually set to the frequency of the transmitted signal, and the receiver operator can thereby distinguish the particular line which is radiating the transmitted signal from the other, nearby lines.

More specifically, FIG. 1 illustrates a perspective view of a conventional aboveground locator system utilizing an active signal source. Transmitter 10 is positioned on the surface of earth 15 above buried line 20, which is the concealed object to be traced. Transmitter output connector 12 is connected to wire 18, which is in turn connected to conductive line 20. The connection of wire 18 to line 20 may be accomplished by directly attaching wire 18 to line 20, thus providing an electrical connection therebetween, or by connecting a toroidal clamp (not shown) to wire 18 and placing the clamp around line 20 to thereby induce a current. Thus, the output signal of transmitter 10, which is an AC continuous wave (CW) signal, is induced into line 20. Ground stake 16 is placed deep into the earth and connected to transmitter 10 by ground lead 17, in order to provide a ground return path for the signal current induced into line 20. Consequently, the output signal from transmitter 10, which is at a unique frequency, generates an electromagnetic field that radiates from line 20 with a field pattern such as that illustrated in FIG. 2. Alternatively, if line 20 is buried to the extent that it is inaccessible by wire attachment or toroidal clamp, the output signal is coupled to internal coil 11 in transmitter 10, which radiates electromagnetic field 32 corresponding to the CW signal. The radiated signal propagates through earth 15, is induced into line 20, and reradiates from line 20 with a field pattern such as that illustrated in FIG. 2. Receiver 30 is positioned on or above the surface of earth 15 in the general vicinity of line 20 and manually set by an operator to the frequency of the transmitted signal. By sensing and processing the signal radiated from line 20, and using conventional locating techniques, the receiver operator locates the position of line 20 and traces the signal along the line's path.

FIG. 3 illustrates a perspective view of a conventional subterranean type of active signal source locator transmitter which, in this case, is utilized for tracing the progress of a boring tool. It is often necessary to trace the progress of a steerable, underground boring tool in order to guide the tool to its destination and avoid contacting existing lines with the tool. Referring to FIG. 3, transmitter 50 is placed either within or closely behind boring tool 52. Transmitter 50 radiates a signal through earth 15 to aboveground receiver 30. In response to location information provided by the receiver operator, an operator (not shown) of boring tool 52 rotates drill string 54 about its boring axis to control the direction of boring tool 52.

In another conventional application, it is sometimes required to detect and trace the paths of plastic or concrete underground pipes. Since these lines are nonconductive, there is no way to trace them by inducing an alternating current signal in them and detecting the radiated electromagnetic field. Consequently, a small subterranean transmitter is inserted into the plastic or concrete line, and the electromagnetic field radiated from the transmitter is detected by an aboveground receiver and traced by an operator along the path of the line. Referring to FIG. 4, subterranean transmitter 60, an active signal source, includes coil 62 which is wrapped around ferromagnetic rod 64. Coil 62 is energized with a closely controlled signal frequency by oscillator 66. Oscillator 66 is powered by an internal battery (not shown). Subterranean transmitter 60 is attached to rod 68 and pushed down the length of plastic or concrete line 65. Receiver 30 detects and processes the electromagnetic field radiated by transmitter 60. Consequently, a locator operator can trace the position of subterranean transmitter 60 as it is routed through line 65.

Conventional locator systems are relatively inflexible and inefficient from an operational standpoint, because they are constrained to performing only their primary locating functions. Because locating, distinguishing and tracing multiple, concealed underground lines has become increasingly time consuming and costly, a need has existed in the art of locator system design to provide more flexible and less costly locating techniques and equipment. For example, at a relatively large excavation site, it may be necessary to trace different lines utilizing both an aboveground and a subterranean transmitter. Utilizing a conventional active signal source locating system, an operator selects a particular line to be traced, attaches a coupling wire from a transmitter to the line and a lead from the transmitter to a ground stake, and manually selects a transmitter frequency. Either the same or another operator sets up the locator receiver to receive the transmitted signal (i.e., selects the appropriate receiver frequency) and then proceeds to locate and trace the line of interest. Since the conventional locator transmitter is configured to output only one signal frequency at a time, the operator is limited to tracing one line at a time with one transmitter. Consequently, if more than one line is to be traced simultaneously, then a separate transmitter must be attached to each line to be traced. However, the present invention is not so limited by such constraints. For example, in order to reduce the time required to trace a number of separate lines, without incurring the cost of utilizing a multiple number of separate transmitters, the present invention utilizes one locator transmitter capable of coupling a separate identification signal to each of the lines to be traced. Consequently, each line radiates a unique signal that can be identified by an operator utilizing a suitably adapted receiver.

Additionally, it is sometimes necessary for an operator to change the type of transmitter to be used for a particular locator application. If, for example, an operator utilizes a conventional aboveground transmitter coupled to an underground line, the receiver is configured to detect and process the signal unique to that type of transmitter. If the operator is then required to utilize a conventional transmitter located in a steerable boring tool, in order to bore an underground tunnel at the same site, the receiver may have to be configured differently (retuned), or perhaps a different receiver may have to be employed, to detect the transmitted signals from the subterranean transmitter and trace the progress of the tool during the boring process. The present invention is not limited to such a time-consuming process but instead provides a locator system having a transmitter capable of transmitting its own product identification signal to a receiver which, in turn, is capable of automatically reconfiguring itself to operate compatibly with the type of transmitter in use.

Also, from an operational efficiency standpoint, it would be desirable to provide a transmitter located in a steerable boring tool, such as that described in the example above, which is capable of encoding the angular position information from the boring tool onto the transmitted signal. Moreover, it would be desirable to transmit the angular position information in digital form, in order to minimize the effects of noise and interference on the transmitted signal. Such a digital encoding capability is not presently available with conventional locator systems. However, as described in more detail below, the present invention provides such novel capabilities.

Finally, conventional active locator systems as shown in FIG. 1, provide no direct communications link between the transmitter and receiver. Consequently, for example, if a transmitter operator wishes to direct a receiver operator to change the receiver's frequency to correspond to a new transmitter setting, or to communicate some other type of operational information to the receiver operator, a two-way radio or field telephone is typically used. Alternatively, the receiver operator may have to travel to the location of the transmitter and personally converse with the transmitter operator, which is a time-consuming alternative. Therefore, it would be desirable to provide a locator system that is capable of transmitting a voice signal over the electromagnetic field radiating from an underground line, in order to provide a built-in communications link. Moreover, while locating lines at a site where only one person is employed to operate both the transmitter and receiver, it would be desirable to provide a system that can transmit an audible tone or other type of analog signal to the operator at the receiver, which indicates certain operating characteristics of the portable transmitter such as, for example, battery power level. No such capability is presently available in conventional locator systems. However, the present invention provides a built-in communications link between an aboveground locator transmitter and receiver that includes such an analog signal and/or voice transmission capability.

SUMMARY OF THE INVENTION

Accordingly, it is an object of the present invention to provide an improved locator system that transmits information along with the electromagnetic signal radiated from an underground object or subterranean transmitter, and receives and processes the information.

It is a further object of the present invention to provide an improved locator system that encodes digital information onto the electromagnetic signal radiated from an underground object or subterranean transmitter, and receives and processes the digital information.

It is yet another object of the present invention to provide an improved locator system that modulates analog information onto the electromagnetic signal radiated from an underground object, and receives and processes the analog information.

It is yet another object of the present invention to provide an improved locator system that encodes roll angle and pitch angle information onto the electromagnetic signal radiated from an underground transmitting apparatus, and receives and processes the angulaR information and displays it for the purpose of directing and controlling an underground boring tool.

It is yet another object of the present invention to provide an improved locator system that transmits a selected digital identification code over the electromagnetic signal radiated from an underground object or subterranean transmitter, and receives and processes the identification code.

It is yet another object of the present invention to provide an improved locator transmitter that simultaneously transmits multiple identification codes over the signals radiated from multiple underground lines for the purpose of distinguishing between the multiple lines, and an improved locator receiver that receives and processes the identification codes.

It is yet another object of the present invention to provide an improved locator transmitter that transmits a product code characteristic of the type of transmitter over the electromagnetic signal radiated from an underground object or a subterranean transmitter, and an improved locator receiver that receives and processes the product code.

It is yet another object of the present invention to provide an improved locator transmitter and receiver that reduce operational time and costs.

In accordance with the present invention, an improved locator system is provided which transmits digital and analog information along with an electromagnetic signal that is radiating from an underground source. The locator system includes either an aboveground or subterranean transmitter that modulates its output signal by turning its output signal on and off in response to a sequence of digital words. The aboveground transmitter also modulates an analog signal onto the transmitted signal. The modulated analog signal can include a computer-generated audio frequency signal or a voice signal. The improved locator system also includes a receiver that senses and detects the transmitted digital or analog signal impressed on the radiated electromagnetic signal from the underground source. The receiver also demodulates the transmitted analog signal and provides an audio output signal to an operator.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

Figure 2:
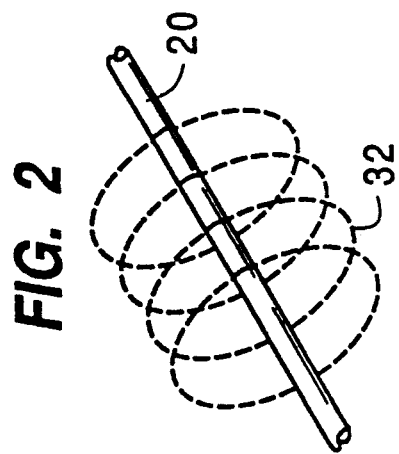
FIG. 2 illustrates the electromagnetic field produced by a current-carrying conductor.
Figure 1:
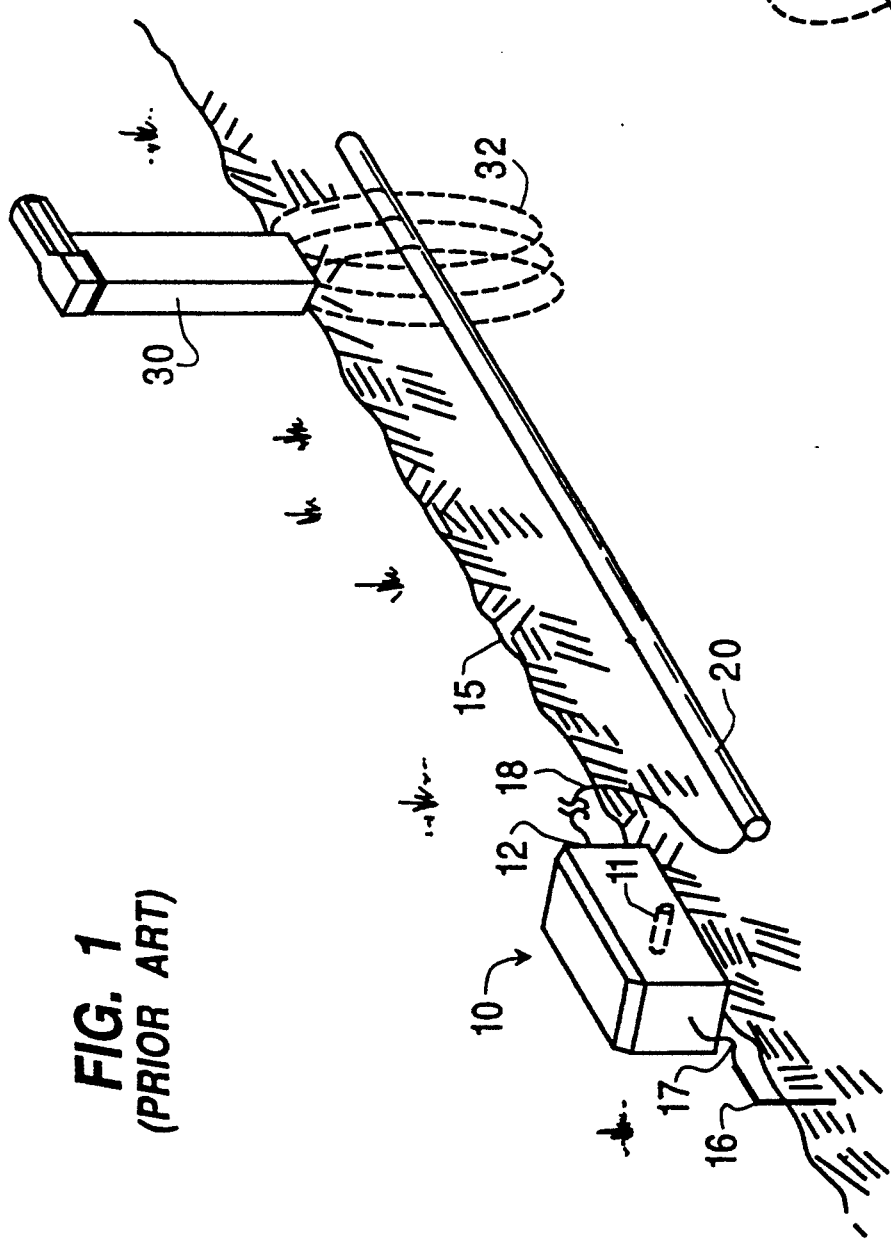
FIG. 1 illustrates a perspective view of a conventional aboveground locator system for locating underground conductive lines.
Figure 3:
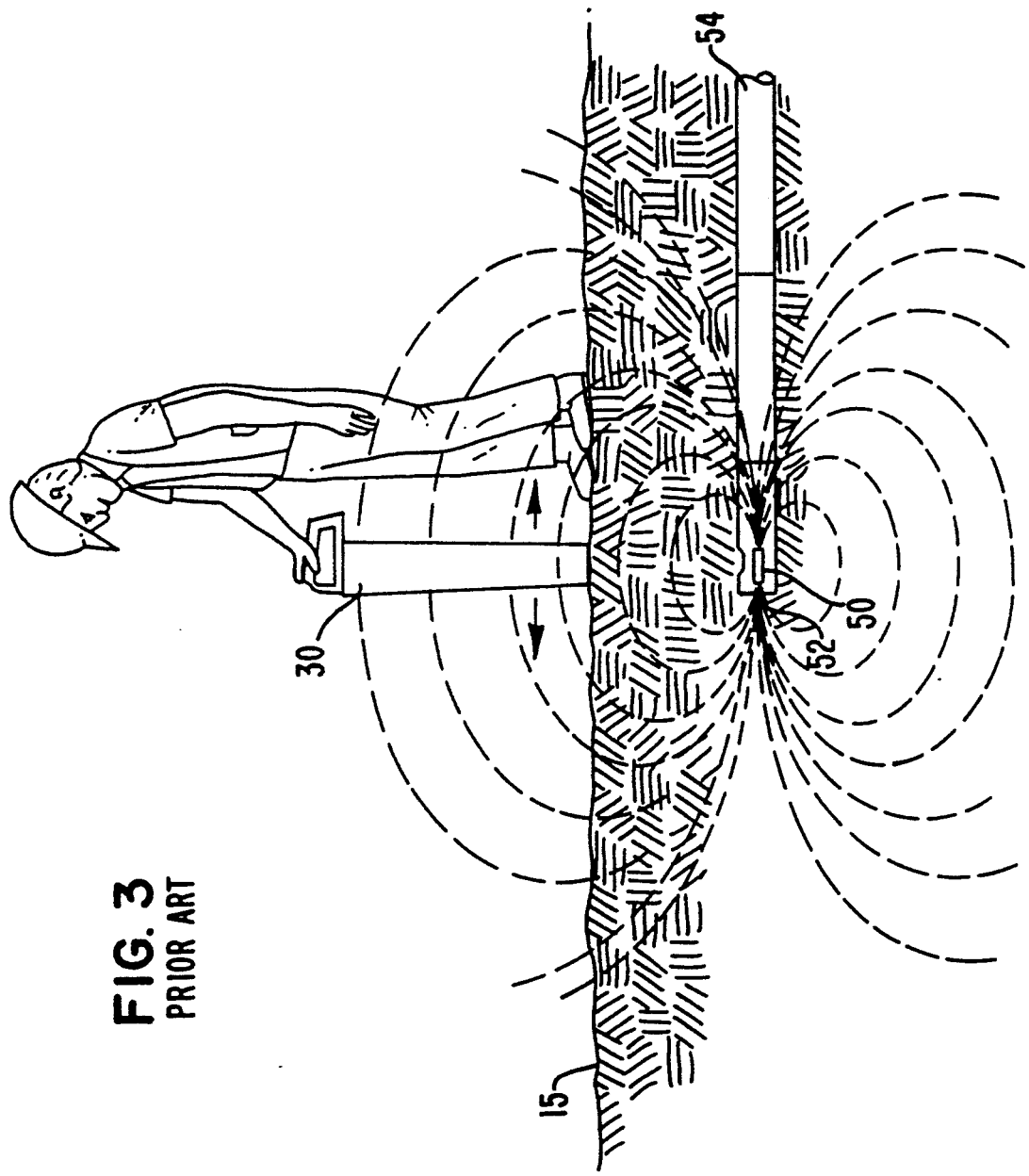
FIG. 3 illustrates a perspective view of a conventional locator system for locating a boring tool using a subterranean transmitter.
Figure 4:
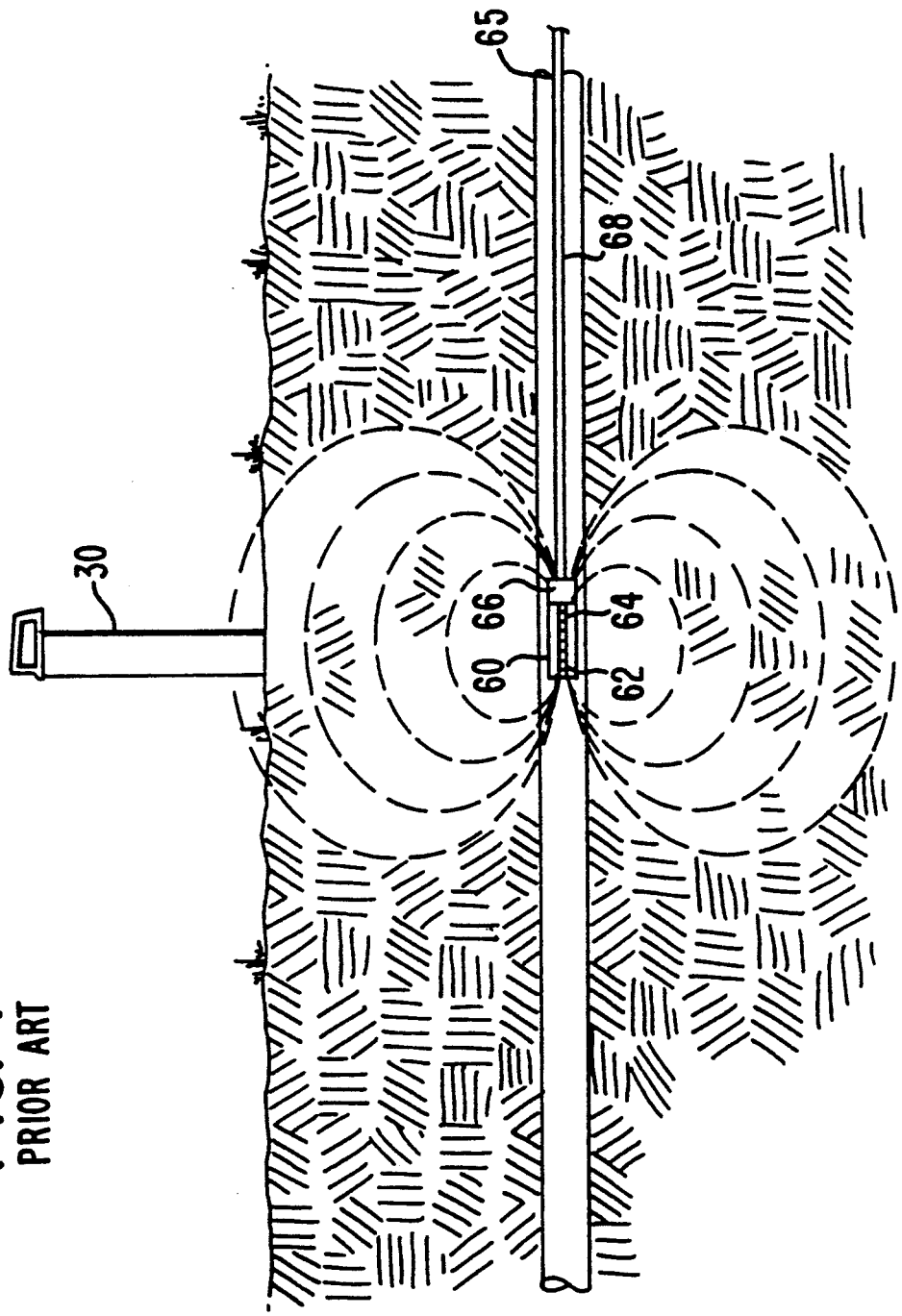
FIG. 4 illustrates a perspective view of a conventional locator system for tracing non-conductive underground conduits using a subterranean transmitter.
Figure 5:
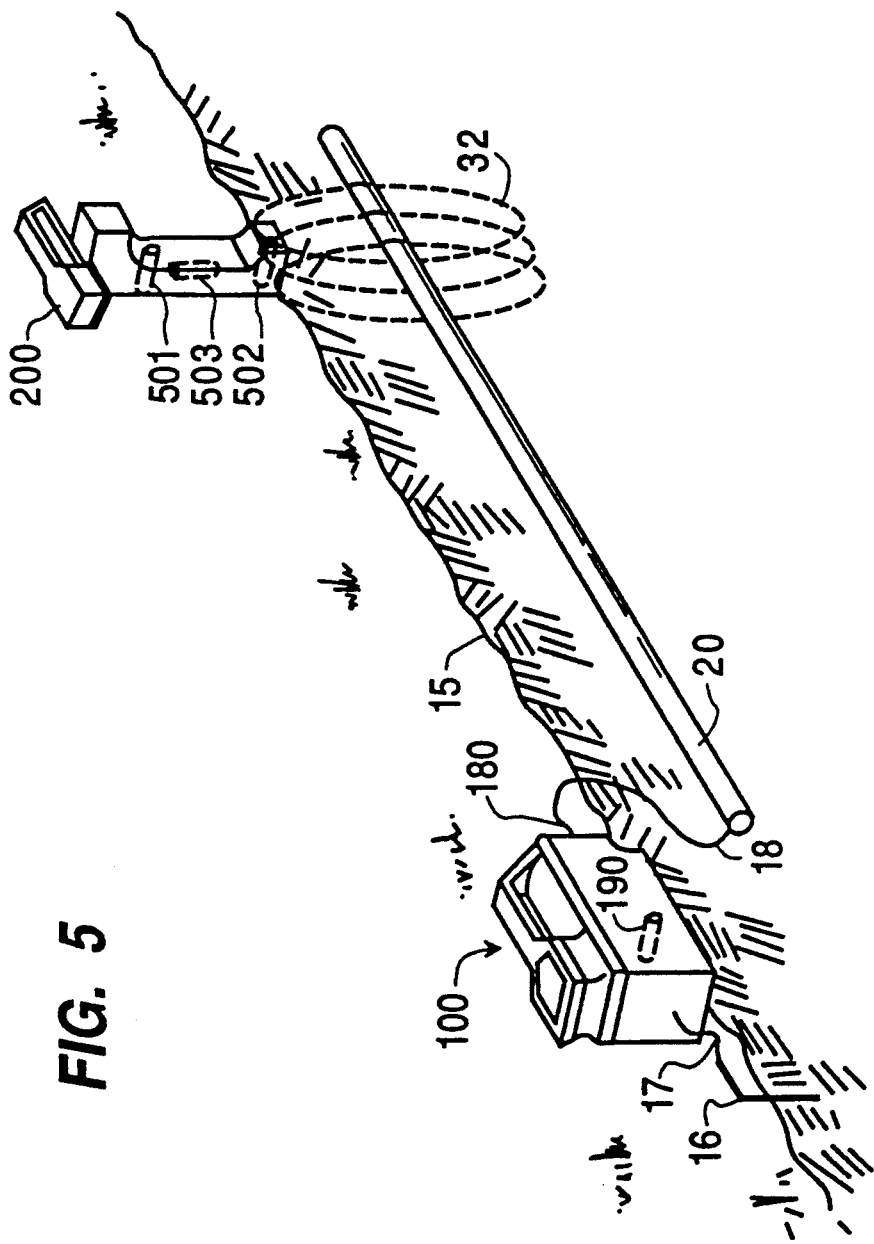
FIG. 5 illustrates a perspective view of an improved aboveground locator system in accordance with a first embodiment of the present invention.
Figure 6:
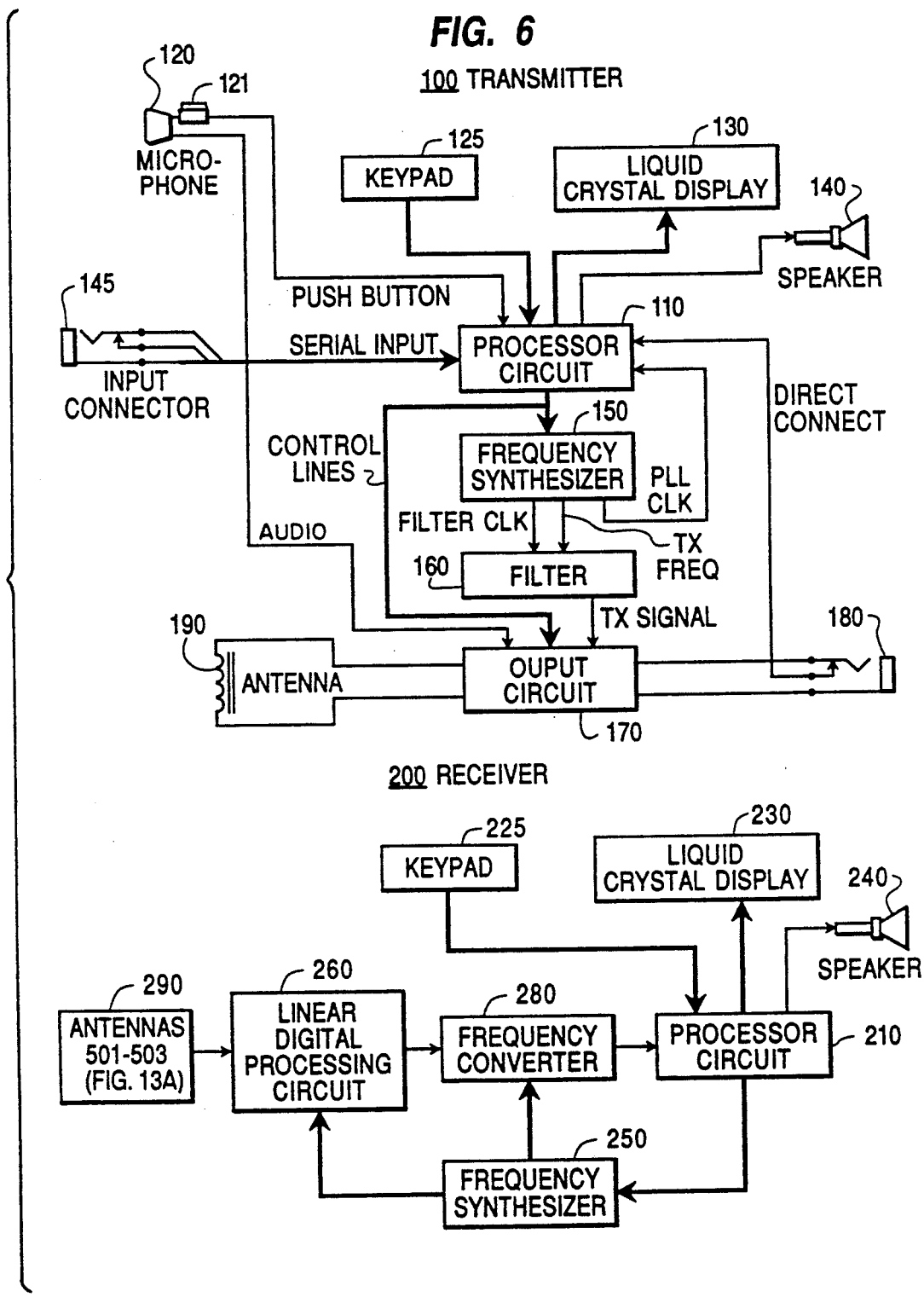
FIG. 6 is an electrical block diagram of the locator system of FIG. 5.

Referring to the drawings in detail, wherein like numerals indicate like elements, FIG. 5 illustrates a perspective view of an improved aboveground locator system in accordance with a preferred embodiment of the present invention. As described in more detail below, the locator system of FIG. 5 includes improved transmitter 100, which provides an output carrier signal modulated with digital or analog information. The modulated signal is coupled to an underground conductive line, and an electromagnetic field impressed with the modulated signal is radiated from the line. Improved receiver 200 senses the radiated electromagnetic signal, detects the digital or analog information from the sensed signal, and processes the information for display or other use at the receiver. FIG. 6 illustrates a block schematic diagram of the locator system shown in FIG. 5. A related, improved locator system which is capable of providing an operator with the flexibility to select a relatively large number of operating frequencies so as to avoid or minimize the effects of extraneous signals typically found in a locating environment, such as power line harmonics, VLF radio broadcast signals, or relatively high ambient noise in certain locating bands, is disclosed and claimed in commonly-assigned, copending Application Ser. No. 902,525, filed Jun. 22, 1992, which is a continuation application of U.S. Ser. No. 539,616, filed Jun. 18, 1990, now abandoned entitled "An Improved System For Locating Multiple Concealed Underground Objects", which is expressly incorporated herein by reference. With respect to the following detailed description, it is noted that the structures and operations of specific electronic circuit arrangements are provided for illustrative purposes only. Thus, any specific component reference by manufacturer's Model No. is disclosed by way of example only. It is not intended that the present invention should be limited to the specific components described thereto. Any appropriate circuit arrangement may be utilized that can provide the present invention's function of transmitting digital and analog information over the electromagnetic signal radiated from an underground object or subterranean transmitter, and detecting and processing that information with an aboveground receiver.

AN IMPROVED LOCATOR TRANSMITTER

Referring to FIG. 5, aboveground transmitter 100 is positioned on the surface of earth 15 above buried line 20. Transmitter output connector 180 is connected to wire 18, which is in turn connected to conductive line 20. The output carrier signal from transmitter 100 is induced into line 20. Ground stake 16 is placed deep into the earth and connected to transmitter 100 by ground lead 17, in order to provide a ground return path for the signal current induced into line 20. Alternatively, the output signal from transmitter 100 may be coupled to internal antenna 190 in transmitter 100, which radiates the output carrier signal through the earth. This signal is then induced into line 20. In each case, the induced carrier signal generates electromagnetic field 32 around line 20. Receiver 200 is positioned on or near the surface of earth 15 in the general vicinity of line 20. Receiver 200 is tuned to the frequency of the transmitted signal, and the radiated signal is sensed by antennas 501-503 in receiver 200. By sensing and processing the signal radiated from line 20, the receiver operator locates the position of line 20 and traces the signal along the line's path. However, as described in more detail below, transmitter 100 modulates digital or analog information onto the carrier signal. This modulated information signal is induced into line 20, which radiates electromagnetic field 32 carrying the modulated information signal. Receiver 200 detects and processes the information from the carrier signal utilizing at least one of antennas 501-503 to sense the radiated signal.

Referring now to FIG. 6, transmitter 100 includes processor circuit 110, which is a digital processor and its associated circuitry that coordinates and controls all functions of transmitter 100 and any command and communications interface with an operator. Processor circuit 110 includes microcontroller 111 (FIG. 7) that provides control signals over control lines to all of the digitally-controlled components of transmitter 100. The specific technique of addressing individual digital circuit components and transferring data to them is well known and not shown in detail in the drawings. An operator (not shown) inputs commands to processor circuit 110 using keypad 125. Processor circuit 110 communicates information back to the operator using liquid-crystal display 130 and speaker 140. A more detailed description of the command and communications interface circuit between the operator and processor circuit 110 is disclosed in commonly-assigned, copending Application Ser. No. 539,552, filed Jun. 18, 1990, entitled Locator Transmitter Having Automatically Tuned Antenna, which is expressly incorporated herein by reference. Input connector 145 is an auxiliary input connection that may be used to couple data in digital form to transmitter 100 from an external source such as, for example, a personal computer.

The carrier signal supplied by transmitter 100 is generated by frequency synthesizer 150 and filtered by digitally controlled filter 160. Processor circuit 110 provides a control signal to output circuit 170 in order to control the amplitude modulation of the transmitter's output signal. An output signal from output circuit 170 is coupled to transmitter output connector 180. If no external output cable is connected to output connector 180, the output signal is then coupled from output circuit 170 to antenna circuit 190. Microphone 120 provides an analog (audio) signal to output circuit 170, which modulates the output carrier signal with the analog signal. Thus, an audio signal such as, for example, an operator's voice signal may be transmitted along with the carrier signal to antennas 501-503 in receiver 200.

Frequency synthesizer 150 produces two output signals under the control of processor circuit 110. The two output signals are: TX FREQ, which represents the frequency of the carrier signal to be transmitted, and FILTER CLK, which is provided to tune digital filter 160. The detailed description of the structure and operation of frequency synthesizer 150 is disclosed in commonly-assigned, copending patent Application Ser. No. 902,525, filed Jun. 22, 1992, which is a continuation of U.S. Ser. No. 539,616, filed Jun. 18, 1990, now abandoned, entitled "An Improved System For Locating Multiple Concealed Underground Objects", which is expressly incorporated herein by reference. Filter 160 is a digitally controlled filter comprising a dual monolithic switched-capacitor filter including two sections which are connected in series and configured to form a bandpass filter.

Figure 7:
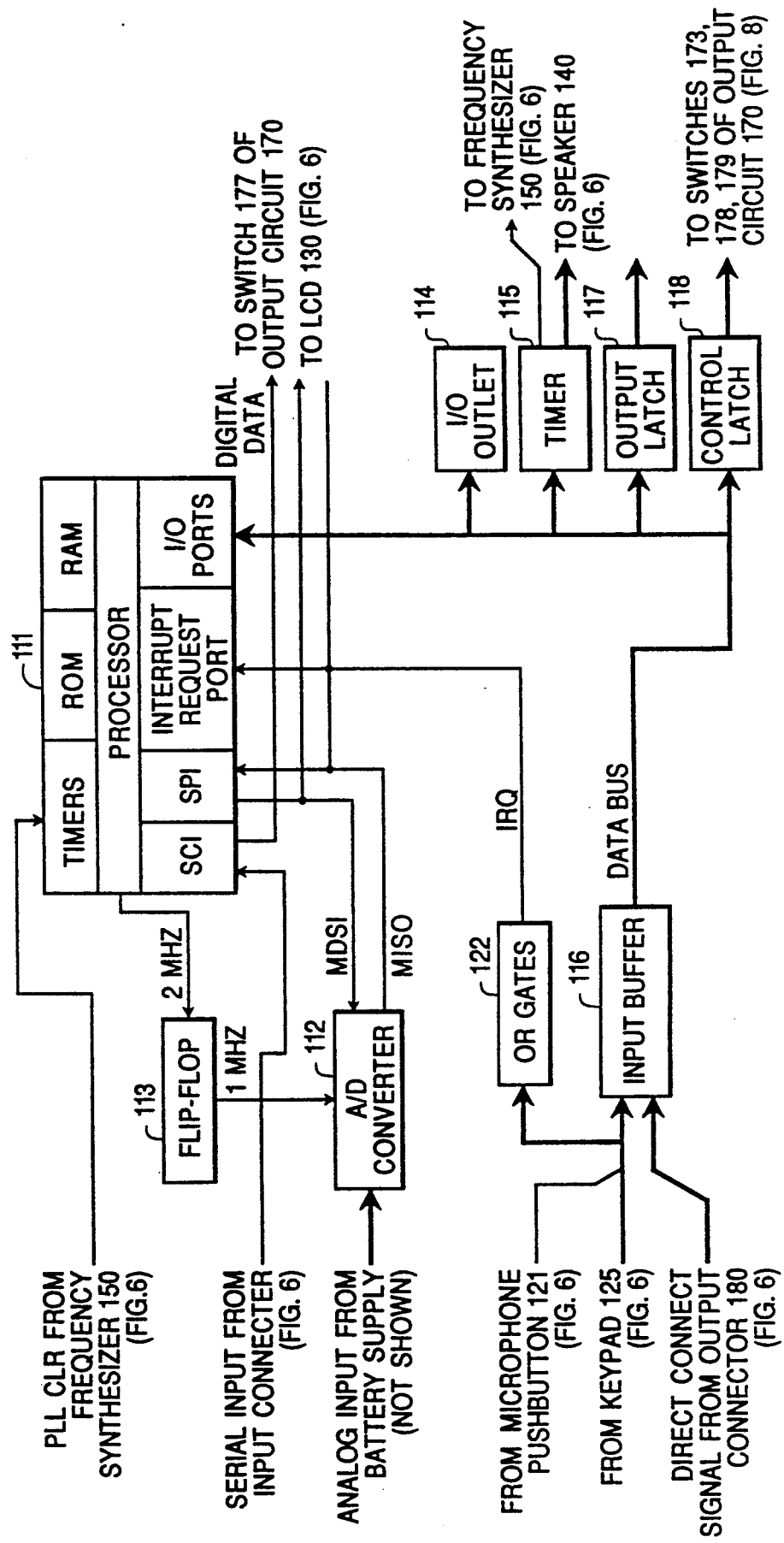
FIG. 7 is an electrical block schematic diagram of the transmitter processor circuit of FIG. 6.

The details of transmitter processor circuit 110 are shown in FIG. 7. Referring to FIG. 7, microcontroller 111 comprises a processor, read-only memory (ROM), random-access memory (RAM), an asynchronous bidirectional serial communications interface (SCI) integral with a baud rate generator, a synchronous bidirectional serial peripheral interface (SPI), a timer system, and three input-output ports (I/O ports). All of the above-described components may be located on an individual semiconductor chip. In a preferred embodiment of the present invention, microcontroller 111 may, for example, comprise a Motorola MC68HC705C8 type microcontroller. Analog-to-digital (A/D) converter 112, which may, for example, comprise an 11 channel, 8 bit Motorola MC45040P2 type A/D converter, is connected to microcontroller 111 through the microcontroller's bidirectional SPI port. Liquid-crystal display 130 is programmed by microcontroller 111 through the SPI interface, using the MISO and MOSI serial data lines of the SPI port in microcontroller 111. A 1-MHz clock signal for A/D converter 112 is provided by a 74HC74 type flip-flop circuit 113, which divides the microcontroller's crystal-controlled frequency of 2 MHz in half. I/O select circuit 114, which may, for example, comprise a 74HC138 type 1-of-8 decoder, generates input/output select signals from the signals on three of the I/O port lines of microcontroller 111. Programmable timer 115 which may, for example, comprise an 82C54 type programmable timer, includes three internal programmable timers. One internal timer provides a reference frequency signal for frequency synthesizer 150, another is utilized in the feedback loop of frequency synthesizer 150, and the third timer provides the clock signal for digitally controlled filter 160. Output latch 117 and control latch 118 which may, for example, comprise two 74HC374 type latches, are set by microcontroller 111 to control the functions of transmitter 100. OR gate circuit 122 generates an interrupt request (IRQ) which is coupled to the interrupt request port of microcontroller 111. Microcontroller 111 then polls the inputs to OR gate circuit 122 from keypad 125 and push-to-talk button 121, by using input buffer 116 to determine the source of the interrupt request.

An analog input signal (battery supply) which is to be measured and monitored, is coupled to A/D converter 112, which then provides the battery signal in digital form (MISO) to the SPI in microcontroller 111. However, the present invention is not limited to providing just a battery supply analog input signal. Other analog input signals may be provided to A/D converter 112, such as regulated power supply voltages, circuit board temperature, and transmitter output voltage and output current. As described in more detail below with respect to the transmission of information, these analog input signals may be transmitted along with the normal carrier signal and monitored by a receiver operator at a location remote from the transmitter. The ability to monitor these analog signals at a location remote from the transmitter is a critical feature of the present invention. For example, it is important to monitor the circuit board temperature of a subterranean transmitter. A high circuit board temperature may indicate overheating with respect to a fluid-assisted boring device if the fluid jets are plugged. Also, such overheating may occur with a percussion boring device as it is withdrawn from a borehole, since the soil heat-sink effect is reduced while withdrawing the tool from a hole as compared to the heat-sink effect encountered in forming the hole. In such overheated conditions, a conventional subterranean transmitter could "melt down" if the drilling were to continue.

Figure 8:
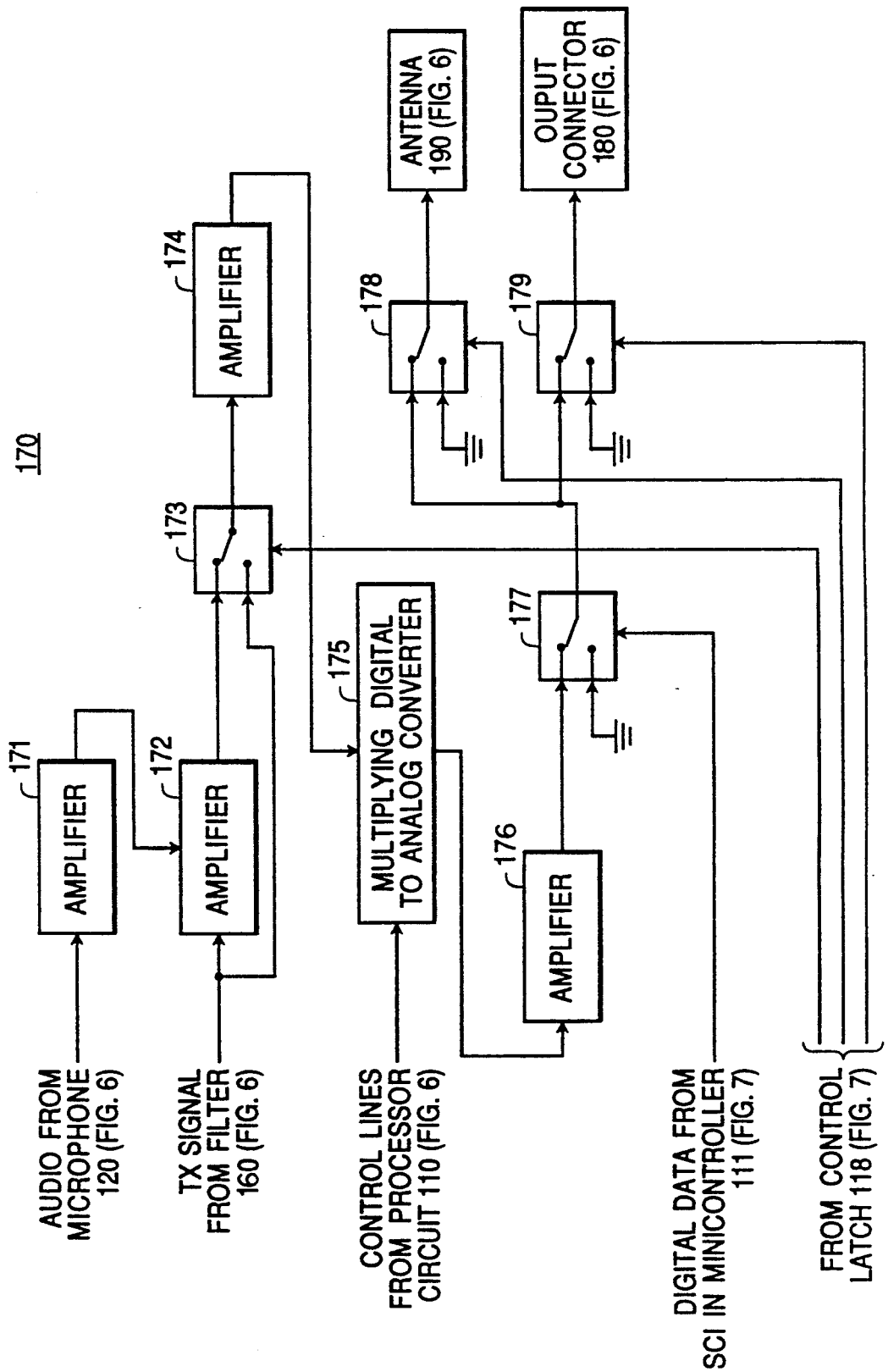
FIG. 8 is an electrical block schematic diagram of the transmitter output circuit of FIG. 6.

The details of output circuit 170 are shown in FIG. 8. Referring to FIG. 8, an audio signal from microphone 120 (FIG. 6) is amplified by amplifier 171 which may, for example, comprise one section of a two section LM13600 type transconductance amplifier. The amplified signal output from amplifier 171 is coupled to the bias input of amplifier 172, which may comprise the second section of the transconductance amplifier. The output of amplifier 172 is coupled to an input of analog switch 173 which may, for example, comprise one section of a 4053 type triple 2-channel analog multiplexer. The TX SIGNAL output from digital filter 160 (FIG. 6) is coupled to another input of analog switch 173 and an input of amplifier 172. Switch 173 permits either an unmodulated carrier signal or a carrier signal modulated by a voice signal from microphone 120 to be coupled to amplifier 174. The signal output from analog switch 173 is buffered by amplifier 174 which may, for example, comprise one section of a TLC27L2 type dual operational amplifier. The signal output from amplifier 174 is supplied as a reference voltage to one channel of dual multiplying D/A converter 175. Control signals from microcontroller 111 (FIG. 7) are coupled to D/A converter 175 which may, for example, comprise two cascaded TLC7528 type multiplying D/A converters. By providing digital control over D/A converter 175, microcontroller 111 controls the amplitude of the output signal from output circuit 170. The output signal from D/A converter 175 is buffered by amplifier 176 which may, for example, comprise one section of a TLC27L2 type dual operational amplifier. The output of amplifier 176 is coupled to an input of analog switch 177 which may, for example, comprise one section of a 4053 type triple 2-channel analog multiplexer. The other input of analog switch 177 is connected to ground. The output of analog switch 177 is coupled to an input of analog switch 178, which may, for example, comprise one section of a 4053 triple 2-channel analog multiplexer. The other input of analog switch 178 is connected to ground. The output of analog switch 178 is coupled to antenna 190 (FIG. 6). The output of analog switch 177 is also coupled to an input of analog switch 179, which may, for example, comprise one section of a 4053 type triple 2-channel analog multiplexer. The other input of analog switch 179 is connected to ground. The output of analog switch 179 is coupled to output connector 180 (FIG. 6).

For operating as shown in FIGS. 6, 7 and 8, microcontroller 111 interrogates line "DIRECT CONNECT" from output connector 180 (FIG. 6) to determine whether or not an external (i.e., direct connect) cable is connected to output connector 180. Microcontroller 111 then commands digital gain control 175 (FIG. 8) to set an appropriate output signal level. Separate control lines are coupled from control latch 118 of microcontroller 111 (FIG. 7) to each of switches 173, 178 and 179 in FIG. 8. The signals on these lines are latched by control latch 118 under the control of microcontroller 111. Microcontroller 111 then writes a control byte to control latch 118 (FIG. 7), which provides the appropriate bit settings via the control lines to control the positions of switches 173, 178 and 179 in FIG. 8. Thus, by controlling the switch settings, microcontroller 111 selects the signals to be coupled through output circuit 170. For example, switch 173 is set to couple either the output of amplifier 172 or TX SIGNAL to the input of amplifier 174. Switch 177, the operation of which is described in more detail below, is positioned either to pass a signal from amplifier 176 or to connect the switch's output to ground. Amplitude modulation of the output signal is accomplished by switching the position of switch 177, which is driven by the signal DIGITAL DATA from the SCI in microcontroller 111 (FIG. 7). If an external cable is connected to output connector 180, then switch 179 is positioned to couple a signal from switch 177 to output connector 180. Switch 178 is positioned to ground its own output connection. If, on the other hand, no external cable is connected to output connector 180, then the input to switch 179 is grounded and switch 178 is set to pass the signal from switch 177 to antenna 190.

Referring again to FIG. 6, frequency synthesizer 150 produces signal TX FREQ, which is the frequency of the output carrier signal. The signal provided by frequency synthesizer 150 is a square-wave. This square wave signal is filtered by filter 160, which removes the harmonics from the square-wave signal TX FREQ and produces a relatively pure, sine-wave output labeled TX SIGNAL. The harmonics are removed in order to limit extraneous signals from frequency synthesizer 150, which may interfere with nearby but unassociated electronic components. Filter 160 is tuned to the frequency of TX FREQ signal by clock signal FILTER CLK from frequency synthesizer 150. If an operator desires to change the frequency of the transmitted carrier signal, the desired change is applied to microcontroller 111 via keypad 125. Microcontroller 111 commands frequency synthesizer 150 to change the frequency of the TX FREQ signal and also change the frequency of the FILTER CLK signal to filter 160, in order to shift the center frequency of filter 160 to that of the new frequency. Also, as described in more detail below with respect to the operation of receiver 200, transmitter 100 encodes a digital "command code" onto the carrier signal in order to cause receiver 200 to display the new transmitter frequency to the receiver operator. Thus, the receiver operator may then set the new frequency in the receiver.

TRANSMISSION OF DIGITAL INFORMATION

As disclosed above, a novel aspect of the present invention is the capability to transmit digital information utilizing the carrier signal normally established between a locator transmitter and receiver. Although an amplitude modulation technique for transmitting digital information is disclosed herein for illustrative purposes, the present invention is not intended to be limited thereto. Any one of a number of well known modulation techniques may be substituted for amplitude modulation. Referring to FIGS. 7 and 8, microcontroller 111 initializes an internal timer to interrupt the processor after a certain interval. When the interval has ended, microcontroller 111 programs its internal SCI for the correct data format, baud rate, etc. and loads a data byte, representing the information to be transmitted, into the SCI. The output of the SCI is in standard asynchronous serial Non Return to Zero (NRZ) mark/space format, with an 8-bit data word, odd parity, and one stop bit. The output of the SCI is coupled to the digital data input of switch 177. The signal DIGITAL DATA from the SCI causes switch 177 either to pass the carrier signal for transmission, in one position of the switch, or couple the signal to ground in the other position. In the idle condition (mark), the control input to switch 177 goes high and the output of amplifier 176 is connected through switch 177 to its output. When the control input to switch 177 goes low (space), the grounded input of switch 177 is connected to its output. Consequently, the carrier signal from amplifier 176 (the transmitter's carrier signal) is amplitude encoded (turned on and off), in response to the digital signal pattern provided at the output of the SCI in processor circuit 110.

Digital information is encoded onto the transmitted carrier signal utilizing the following data protocol. The first serial data byte transmitted (represented by the data at the output of the SCI) includes a category code which defines the category or type of data being transmitted. For example, one category code may indicate that an ID code is being transmitted, while another category code may indicate that a product code is being transmitted. More specifically, an ID code may be used to indicate the identity of a specific signal from a transmitter. If multiple transmitters are required simultaneously to trace multiple lines, then each transmitter may generate a different ID code in order to permit a receiver operator to distinguish between the different signals and lines. A product code may be used to permit a receiver operator to determine the particular type of transmitter in use such as, for example, a subterranean transmitter or a particular model of aboveground transmitter.

Figure 17:
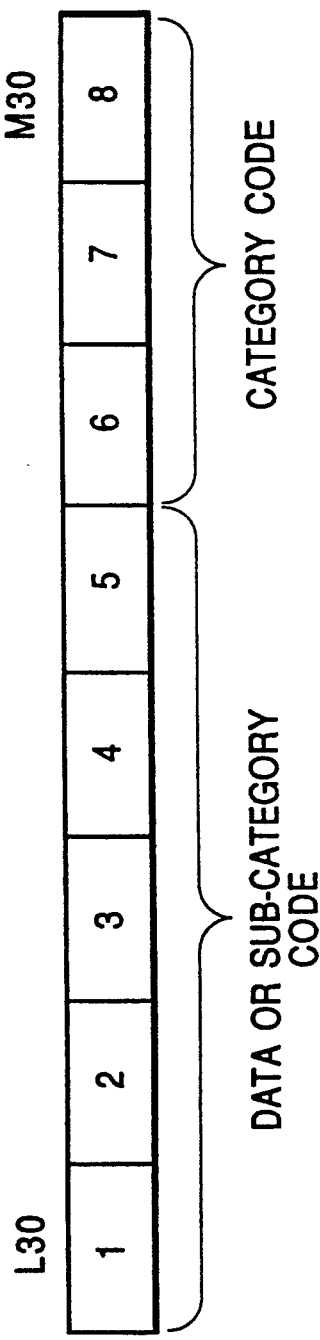
FIG. 17 illustrates a byte format representing categories of encoded information that may be transmitted in accordance with a preferred embodiment of the present invention.

FIG. 17 illustrates a byte format representing categories of encoded information (category codes) that may be transmitted in accordance with a preferred embodiment of the present invention. Referring to FIG. 17 and the chart below, the category codes are numbered 0 through 7, and are represented by the states of bits 6 through 8. The eight data bits of the first serial data byte transmitted have the following significance (the least-significant bit is transmitted first):

CATEGORY CODES

Bits 1 through 5 may represent either data to be transmitted or a sub-category code, depending on the states of bits 6 through 8. Bits 6 through 8 represent a category code. The specific categories that may be encoded are defined as follows:

Category Code 0—This category is a defined spare.

Category Code 1—The data bits 1 through 5 represent a product code. Product code 0 indicates that the byte following the product code is an expanded product code.

Category Code 2—The data bits 1 through 5 represent a transmitter ID code (for distinguishing between output signals).

Category Code 3—The data bits 1 through 5 represent an angle sensor reading (for subterranean transmitters only).

Category Code 4—The data bits 1 through 5 represent electric field strength.

Category Code 5—The data bits 1 through 5 represent boring tool temperature.

Category Code 6—The data bits 1 through 5 define receiver configuration for analog data.

Category Code 7—Undefined at this time.

For example, an operator may select one of 31 identification (ID) codes that are available to identify a particular transmitter's unique signal (e.g., to distinguish between different lines using that transmitter). Different ID codes may also be used to distinguish between different signals from multiple transmitters or, as disclosed below in another embodiment (with respect to FIG. 9), different ID codes may be provided simultaneously by multiple outputs of a single transmitter. Additionally, the operator may select a product code to transmit along with the carrier signal. A product code identifies a particular type of transmitter (e.g., a particular model aboveground transmitter or a subterranean transmitter). As disclosed in more detail below, digital information in the form of product codes may be transmitted along with the electromagnetic signal impressed on and radiated from an underground line, or radiated from a subterranean transmitter, and detected by a novel receiver which is capable of identifying the type of aboveground or subterranean transmitter from which the signal originated by recognizing the product code. The improved receiver is also capable of automatically and optimally configuring itself to operate compatibly with the particular type of transmitter and accordingly utilize the information impressed on the detected signal by that transmitter.

As described above, in addition to ID codes and product codes, command codes are another type of digital information that can be transmitted along with a carrier signal. A command code may be transmitted that is detected by the receiver of the present invention, which causes the receiver to take some kind of special action. For example, just prior to modulating the transmitted signal with analog information, a command code may be transmitted to the receiver. The command code causes the receiver to reconfigure from a tracing or locating mode of operation and adopt an analog mode of operation, in order to detect the analog information following the command code and couple the information to the receiver's speaker.

TRANSMISSION OF AUDIO INFORMATION

In order to transmit analog audio information along with the carrier signal, the transmitter operator presses push-to-talk button 121 on microphone 120 (FIG. 6), which is coupled into transmitter 100. Referring to FIGS. 6 and 7, push-to-talk button 121 is connected to OR gate circuit 122 and input buffer 116. OR gate circuit 122 generates an interrupt request (IRQ) which is coupled to the interrupt request port of microcontroller 111. Microcontroller 111 then polls the inputs from keypad 125 and push-to-talk button 121, by using input buffer 116 to determine the source of the interrupt request. Microcontroller 111 then transmits a command code which is generated and transmitted in the manner already described above with respect to the transmission of digital information. The transmitted command code instructs receiver 200 (FIG. 6) to reconfigure, switching from a normal (tracing) mode to an audio mode of operation. This reconfiguration operation is described below in conjunction with the detailed description of receiver 200. Microcontroller 111 then loads a new control byte to control latch 118, which sets the position of switch 173 to connect the output of amplifier 172 to the input of amplifier 174. The output signal from amplifier 174 is then coupled either to antenna 190 or output connector 180 through D/A converter 175, amplifier 176, and the appropriate combination of switches 177, 178 and 179. As long as the transmitter operator presses push-to-talk button 121, microcontroller 111 continues to determine that an interrupt request is being generated by push-to-talk button 121, and microcontroller 111 does not generate any digital codes for transmission.

Modulation of the audio signal is accomplished by coupling the audio signal from microphone 120, through amplifier 171 to the bias input of transconductance amplifier 172. Amplitude variations of the incoming audio signal cause corresponding variations in the current gain of amplifier 172. The variations in current gain are then translated into voltage variations at the output of amplifier 172. Thus, the output signal from transmitter 100 is amplitude modulated by the audio signal from microphone 120.

If the transmitter operator releases push-to-talk button 121, microcontroller 111 ascertains the lack of an interrupt request from push-to-talk button 121 and loads another control byte to control latch 118, which sets the position of switch 173 to disconnect the output of amplifier 172 from the input of amplifier 174. Thus, the unmodulated TX SIGNAL is processed through output circuit 170 to antenna 190 or output connector 180. Microcontroller 111 then generates a command code in the manner described above with respect to the transmission of digital information, which is transmitted to instruct receiver 200 (FIG. 6) to reconfigure, switching from an audio mode back to a normal (tracing) mode of operation.

TRANSMISSION OF OPERATING STATUS INFORMATION

Utilizing the audio information transmission capability of the present invention, it is possible to communicate the transmitter's operating status information to a receiver operator. For example, if microcontroller 111 (FIG. 7) determines that the battery supply voltage for (portable) transmitter 100 is too low, transmitter 100 can issue an audio tone (generated by conventional circuitry) or a "beep" which is coupled to transmitter speaker 140. Thus, by listening for the "beeps," the transmitter operator may be kept apprised of the battery voltage level. Also, the battery level information can be converted to digital data and supplied directly to a digital readout at the transmitter.

More importantly, however, the present invention is also capable of transmitting the audio tones or beeps to receiver 200 in order to alert an operator at that location. The receiver operator would be kept apprised of the transmitter's battery voltage level, whereby the transmitter may be left unattended and separated by a great distance from the receiver. Unlike prior art locators that required either a separate operator for each transmitter and receiver, or an operator who was required to return and check the transmitter from time to time, with the present invention it is feasible to utilize only one operator who may set up the transmitter and then trace lines with the receiver at a remote location.

In order to transmit an audio tone or "beep" to receiver 200, microcontroller 111 transmits a command code that instructs receiver 200 to reconfigure or switch from a tracing mode to an audio receiving mode. Microcontroller 111 then synthesizes the audio tone by increasing and decreasing the gain of multiplying D/A converter 175 (FIG. 7) at an audio frequency. The audio tone or signal generated at the output of D/A converter 175 is coupled through amplifier 176 (FIG. 8), switch 177, and either switch 178 or 179 to antenna 190 or output connector 180, respectively. Thus, the audio tone may be transmitted via the signal coupled from the internal antenna to an underground conductive line, or through the direct connection to the underground line. After transmission of the "beep" is completed, microcontroller 111 then transmits another command code that instructs receiver 200 to switch from an audio mode back to a normal (tracing) mode of operation.

AN IMPROVED LOCATOR RECEIVER

Figure 13A:
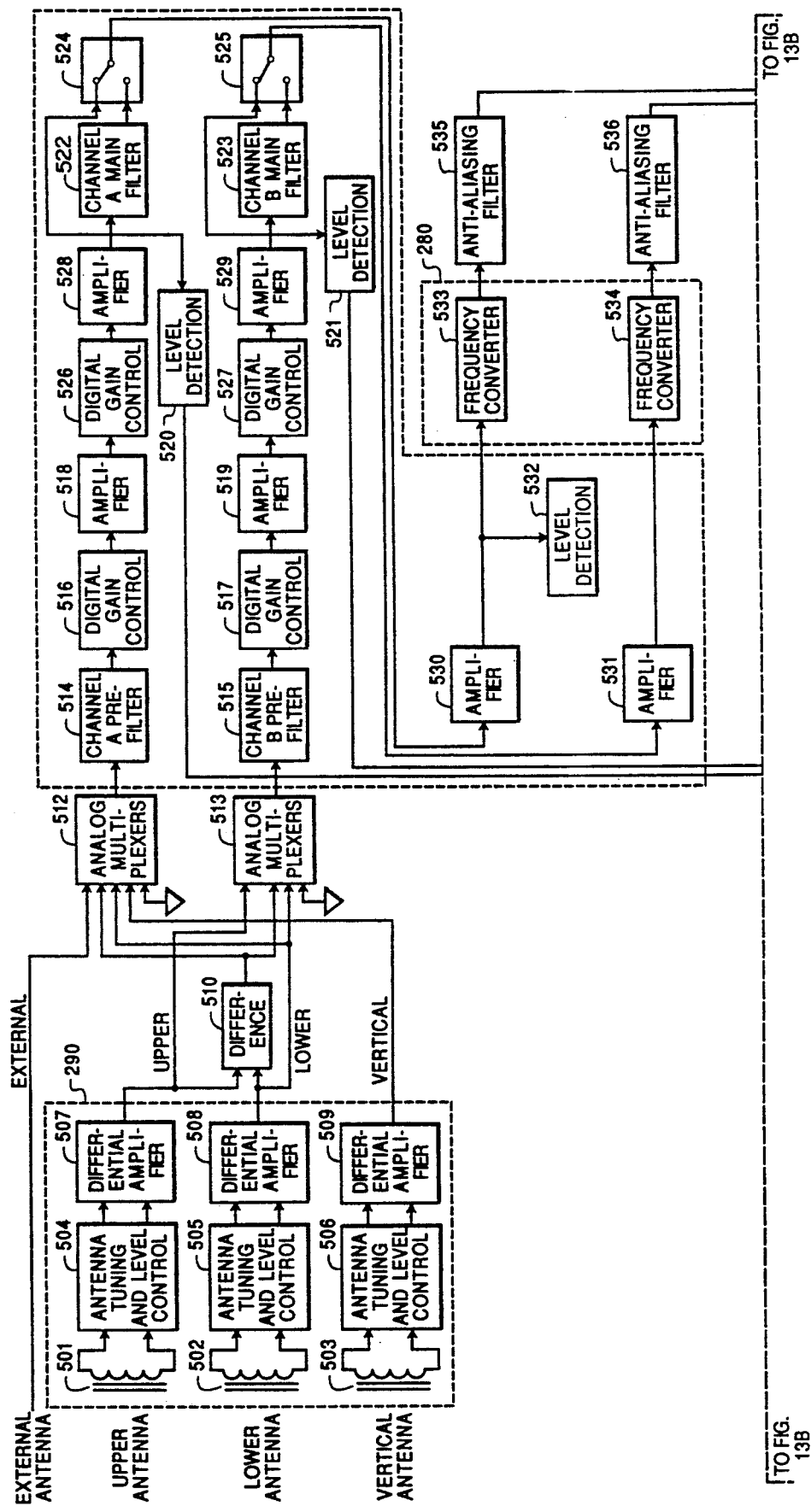
FIGS. 13A and 13B are detailed electrical block diagrams of the locator receiver shown in FIG. 6.
Figure 13B:
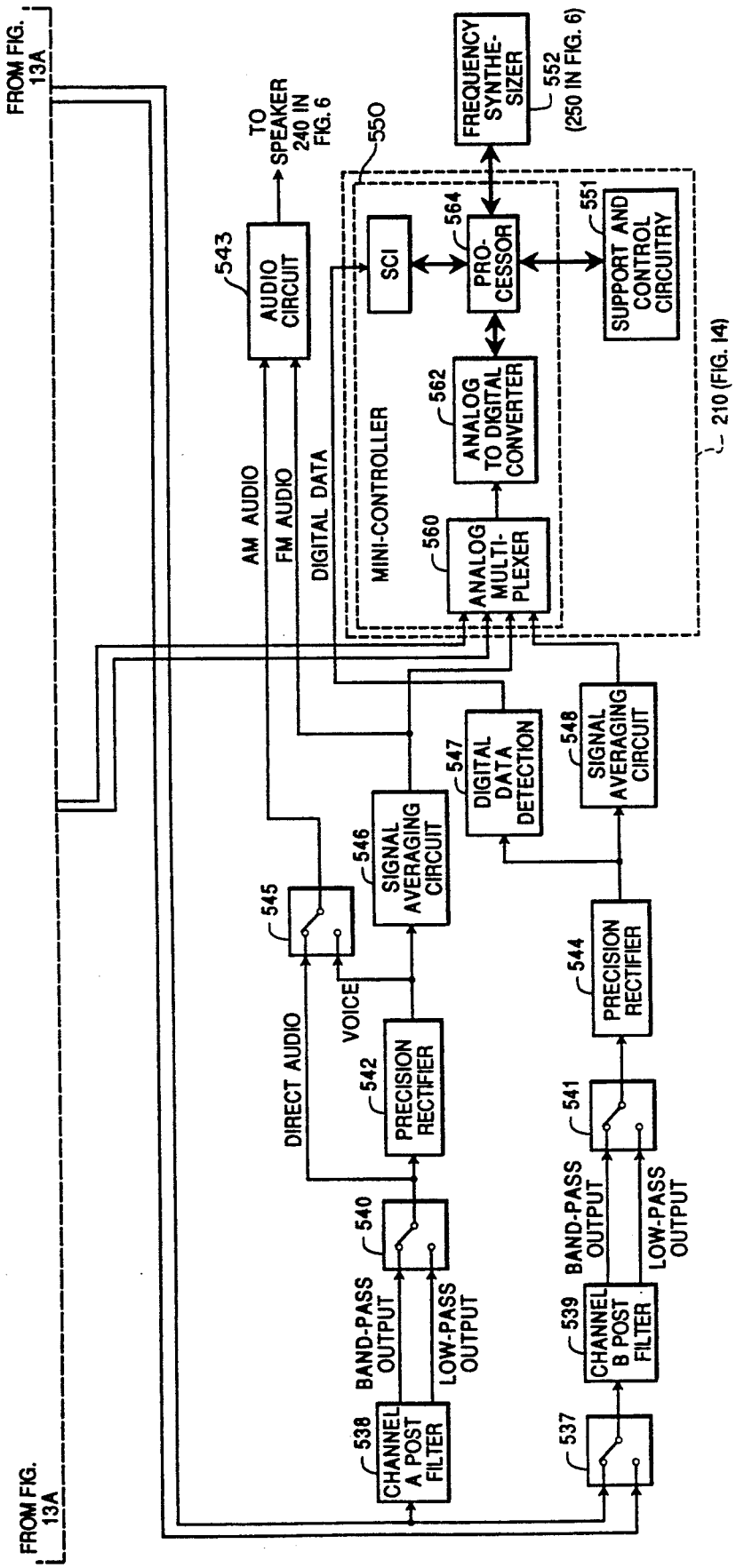

Locator receiver 200 (FIG. 6), which is a preferred embodiment of the present invention, is utilized to receive and process the digital or analog information that has been transmitted along with the normal, tracing electromagnetic signal from transmitter 100. Essentially the same receiver design may be utilized for receiving digital and analog information from both the aboveground and subterranean transmitters of the present invention. FIGS. 13A and 13B and a more detailed block diagrams of the locator receiver shown in FIG. 6. Referring to FIGS. 13A and 13B, processor circuit 210, which comprises microcontroller 550 and its associated support and control circuitry 551, coordinates and controls all operations of receiver 200. An operator (not shown) inputs commands to receiver 200 using keypad 225 (FIG. 6). Receiver 200 communicates information to the operator through liquid-crystal display 230 and loudspeaker 240. The interface circuitry for command and communications between the operator and receiver 200 is disclosed in commonly-assigned, copending Application Ser. No. 539,552, filed June 18, 1990 entitled Locator Transmitter Having Automatically Tuned Antenna, which is expressly incorporated herein by reference.

Referring to FIG. 6, the magnetic component of the electromagnetic field radiated from either an underground conductor (generated by an aboveground transmitter) or a subterranean transmitter, in accordance with the present invention, is detected by antennas 501-503 in antenna circuit 290. In a preferred embodiment, receiver 200 is a general purpose receiver utilized to locate and trace underground objects and subterranean transmitters. Antenna 503 may be used for "null" tracing of an underground object or subterranean transmitter. Antenna 501 is used in conjunction with antenna 502 to measure the depth of the underground object or transmitter. Any one, or combination, of antennas 501-503 may be used to detect a digital or analog amplitude modulated signal carrying information, in accordance with the present invention. The detected signals from antenna circuit 290 are then amplified and filtered within linear signal processor circuit 260. The filtered output signal from linear signal processor circuit 260 is then down-converted to an intermediate frequency (IF) signal by frequency converted 280. Frequency synthesizer 250 provides the signals utilized for the down-conversion process in converter 280 and also for tuning the various filters in processor circuit 260.

FIGS. 13A and 13B are a detailed electrical block schematic diagrams of receiver 200 of FIG. 6. Antennas 501, 502 and 503 are essentially identical in design, but the connections of antenna 501 are reversed with respect to the connections of antenna 502 so as to produce a signal from antenna 501 which is out of phase with the signal from antenna 502 (assuming a common mode magnetic field for both antennas). The signal response of each antenna is tuned or attenuated by respective antenna tuning and level control circuits 504, 505 and 506. The balanced outputs of antenna circuits 504, 505 and 506 are then coupled to the inputs of high gain differential amplifier circuits 507, 508 and 509, respectively. Differential amplifiers 507, 508 and 509 may, for example, each comprise a combination of MC33078 and MC33172 types operational amplifiers. The signals at the single-ended outputs of differential amplifiers 507, 508 and 509 are labeled UPPER, LOWER and VERTICAL, respectively. The UPPER and LOWER signals from differential amplifiers 507 and 508 are coupled to amplifier 510, which comprises an MC33172 type operational amplifier. Amplifier 510 algebraically combines the UPPER and LOWER signals to produce the sum of their signals. Since the UPPER and LOWER signals are 180 degrees out of phase, the summing operation actually provides a difference signal, labeled DIFFERENCE.

There are two channels in the signal processing circuitry, Channel A and Channel B, with similar circuitry in each. The signals UPPER and LOWER from differential amplifiers 507 and 508, DIFFERENCE from amplifier 510, and VERTICAL from differential amplifier 509 are coupled to the inputs of multiplexers 512 and 513, which comprise 4051 type 8-channel analog multiplexers. Each multiplexer 512 and 513 provides one output signal which is selected from the plurality of input signals by microcontroller 550, as will be explained further below. The output signal from multiplexer 512 is coupled to the first stage of signal processing channel A, while the output signal from multiplexer 513 is coupled to channel B. The selected signals for channels A and B are coupled to pre-filters 514 and 515, each of which comprises two sections of an MC33172 type dual operational amplifier. The resulting filtered signals are then coupled to digital gain controls 516 and 517, respectively. Each of digital gain controls 516 and 517 comprises one section of a TLC7528 type multiplying D/A converter. The outputs of digital gain controls 516 and 517 are coupled to respective amplifiers 518 and 519, which comprise MC33172 type operational amplifiers. The outputs of amplifiers 518 and 519 are coupled to digital gain controls 526 and 527, respectively, each of which comprises one section of a TLC7528 multiplying D/A converter. The outputs of digital gain controls 526 and 527 are coupled to respective amplifiers 528 and 529, which comprise MC33172 type operational amplifiers. The outputs of amplifiers 528 and 529 are connected to level detectors 520 and 521, respectively. Level detectors 520 and 521 allow microcontroller 550 to monitor the output signal levels of amplifiers 528 and 529, respectively. Level detectors 520 and 521 may, for example, comprise passive components normally utilized in a conventional peak detector.

Main filters 522 and 523 may, for example, comprise LMF100C type switched-capacitor filters including two bandpass sections connected in cascade. Switches 524 and 525 bypass or include a respective main filter 522 or 523. Each switch may, for example, comprise one section of a 4053 type triple 2-channel analog multiplexer, which is separately controlled by microcontroller 550. A single control line (not shown) from microcontroller 550 switches the Q of both sections of filters 522 and 523 between two sets of predetermined values.

The outputs of switches 524 and 525 are coupled to respective amplifiers 530 and 531, each of which comprises both sections of an MC33172 type dual operational amplifier connected in cascade. Level detector 532 which may, for example, comprise one section of an LM393 type comparator, is connected to the output of amplifier 530 in channel A. Level detector 532 outputs a logic signal to microcontroller 550 that goes low when the signal in Channel A exceeds a predetermined threshold.

The outputs of amplifiers 530 and 531 are coupled to respective frequency converters 533 and 534. Each frequency converter may, for example, comprise an MC33172 type operational amplifier connected as an inverter and one section of a 4053 type triple 2-channel analog multiplexer, which switches between an inverted and un-inverted signal at a rate set by frequency synthesizer 250. The outputs of frequency converters 533 and 534 are coupled to respective anti-aliasing filters 535 and 536. Filters 535 and 536 comprise simple RC integrators whose time constants can be changed.

The output of filter 535 is coupled to post-filter 538 and one input of switch 537. The output of filter 536 is coupled to the second input of switch 537. Switch 537 may, for example, comprise one section of a 4053 type triple 2-channel analog multiplexer. Under the control of microcontroller 550, switch 537 couples either the channel A or channel B signal to post-filter 539. Post-filters 538 and 539 may, for example, comprise MF5 type switched-capacitor filters that provide both a lowpass and bandpass output. The dual outputs from each of post-filters 538 and 539 are coupled to the dual inputs of switches 540 and 541, respectively. Each of switches 540 and 541 may, for example, comprise one section of a 4053 type triple 2-channel analog multiplexer. Under the control of microcontroller 550, switches 540 and 541 select either the lowpass or bandpass output from respective post-filters 538 and 539. The control lines from microcontroller 550 that control switches 540 and 541 also control the separate Q of post-filters 538 and 539 by switching between two predetermined values of Q for each post-filter.

The respective outputs of switches 540 and 541 are coupled to precision rectifiers 542 and 544. Each precision rectifier may, for example, comprise an MC33172 type dual amplifier, wherein one section is utilized as the primary rectifier and the second section buffers the output. The outputs of precision rectifiers 542 and 544 are coupled to respective signal averaging circuits 546 and 548, in which each signal averaging circuit may, for example, comprise one section of an MC33172 type operational amplifier. The output of precision rectifier 542 is also connected to an input of switch 545.

The output of switch 540 is also coupled to the inputs of switch 545. Switch 545 which may, for example, comprise one section of a 4053 type triple 2-channel analog multiplexer, selects either the output of switch 540 or the output of precision rectifier 542 to provide the AM audio signal. The input of digital data detector 547 is connected to the output of precision rectifier 544. The details of digital data detector 547 are discussed below with respect to FIG. 18. The output from digital data detector 547 is coupled to the data input of the SCI of microcontroller 550.

Microcontroller 550 which may, for example, comprise a Motorola MC68HC11A8 type microcontroller, includes an 8-channel analog multiplexer, an A/D converter, an asynchronous SCI, a synchronous SPI, and a timer system. Microcontroller 550 also includes electrically erasable and programmable memory (EEPROM) and RAM. Analog multiplexer 560 selects one of the output signals from level detectors 520 and 521, or from signal averaging circuits 546 and 548. The selected analog signal from analog multiplexer 560 is coupled to A/D converter 562, converted to a digital signal, and input to processor 564. Support and control circuit 551 comprises various microprocessor system components described in more detail below with respect to FIG. 14. The detailed structure and operation of frequency synthesizer 250 is disclosed in commonly-assigned, copending Application Ser. No. 902,525, filed June 22, 1992, which is a continuation application of U.S. Ser. No. 539,616, filed June 18, 1990, now abandoned, entitled "An Improved System For Locating Multiple Concealed Underground Objects", which is expressly incorporated herein by reference.

Figure 15:
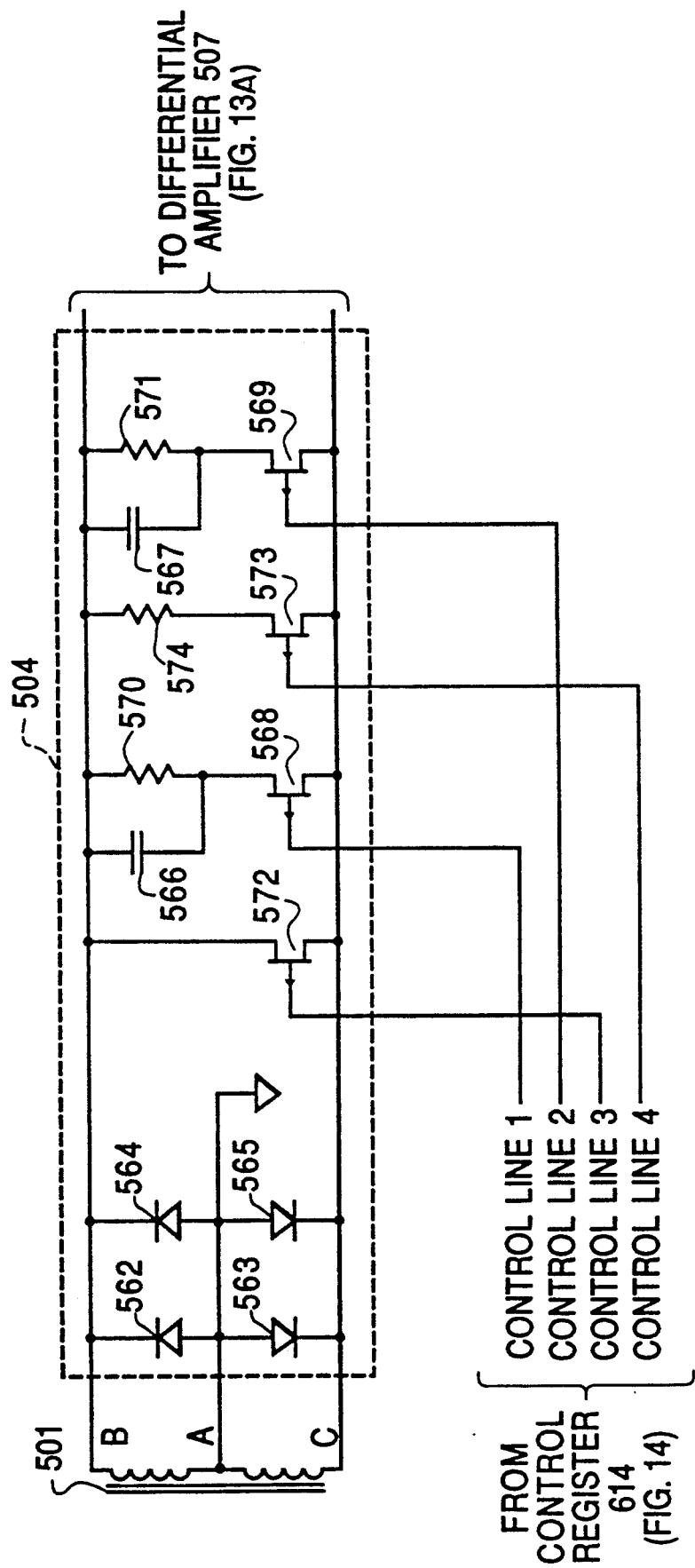
FIG. 15 is a detailed block diagram of one of the identical antenna circuits of FIG. 13.

FIG. 15 is a schematic diagram of antenna tuning circuit 504 in FIG. 13A. Antenna tuning circuit 504 is identical in structure to antenna tuning circuits 505 and 506. Referring to FIG. 15, antenna 501 comprises a center-tapped coil including a ferrite rod to increase the magnetic flux through the coil. Center tap A is connected to ground so that any voltage produced by an ambient electric field in the vicinity of antenna 501 will appear as a common-mode voltage on output taps B and C, and will be rejected by differential amplifier 507. Diodes 562, 563, 564 and 565 protect the antenna circuit from voltage overloads.

Figure 14:
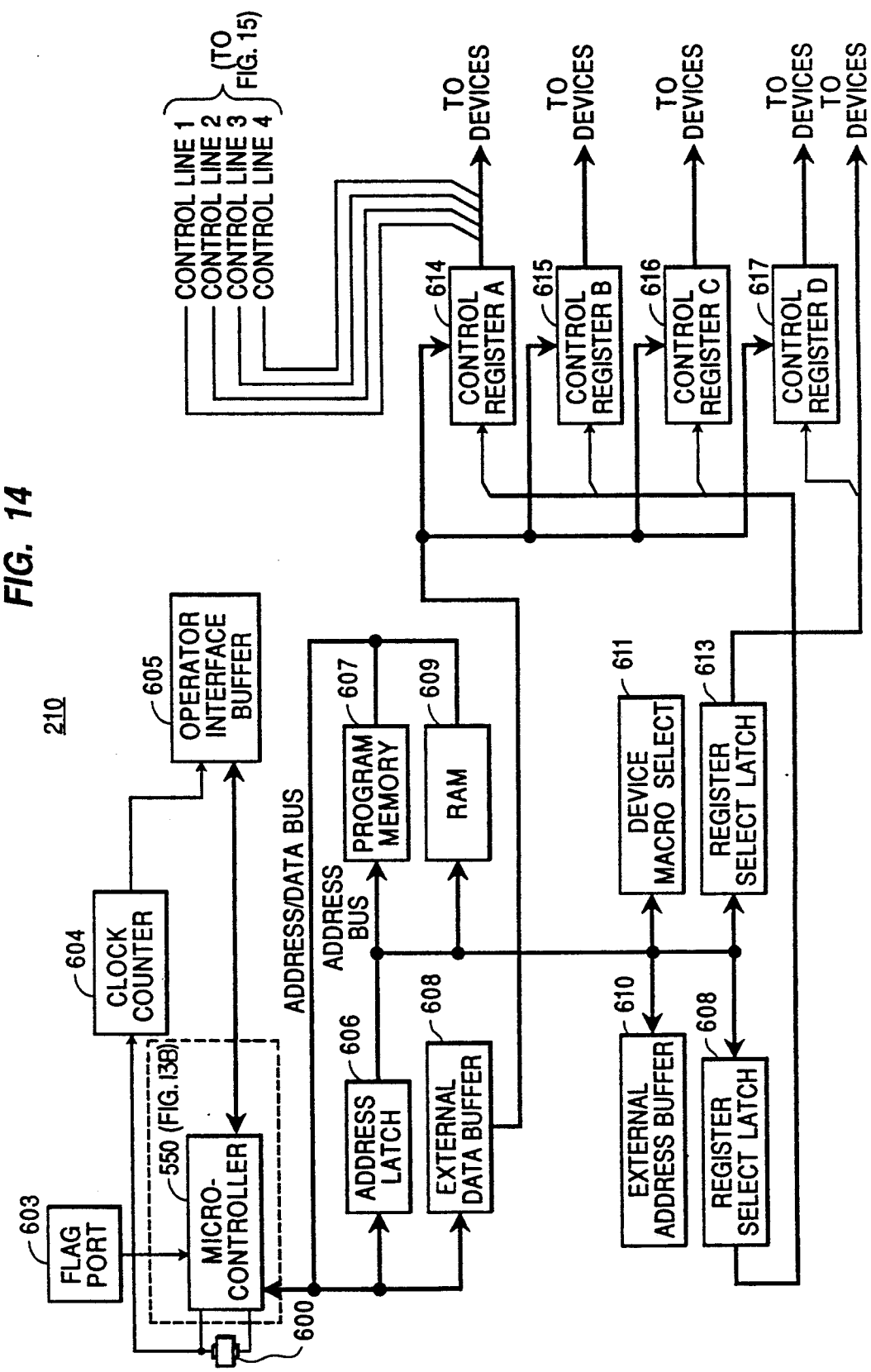
FIG. 14 is a detailed block diagram of the support and control circuit of FIG. 13.

Antenna 501 is tuned to one of two possible resonant frequencies by switching capacitors 566 and 567 and resistors 570 and 571 in or out of the antenna circuit by gating field-effect transistors 568 and 569, under the control of digital signals CONTROL LINE 1 and CONTROL LINE 2 from control register A in FIG. 14. Resistors 570 and 571 reduce the Q of the circuit and broaden the bandpass centered on each of the two resonant frequencies. By gating field-effect transistor 572, the control signal on CONTROL LINE 3 enables a clamp circuit to short the antenna circuit, and CONTROL LINE 4 enables a fixed attenuator circuit to reduce the sensitivity of the antenna circuit by gating field-effect transistor 573. Further, the antenna circuit may be disabled for automatic test purposes by gating field-effect transistor 572 on.

Figure 16:
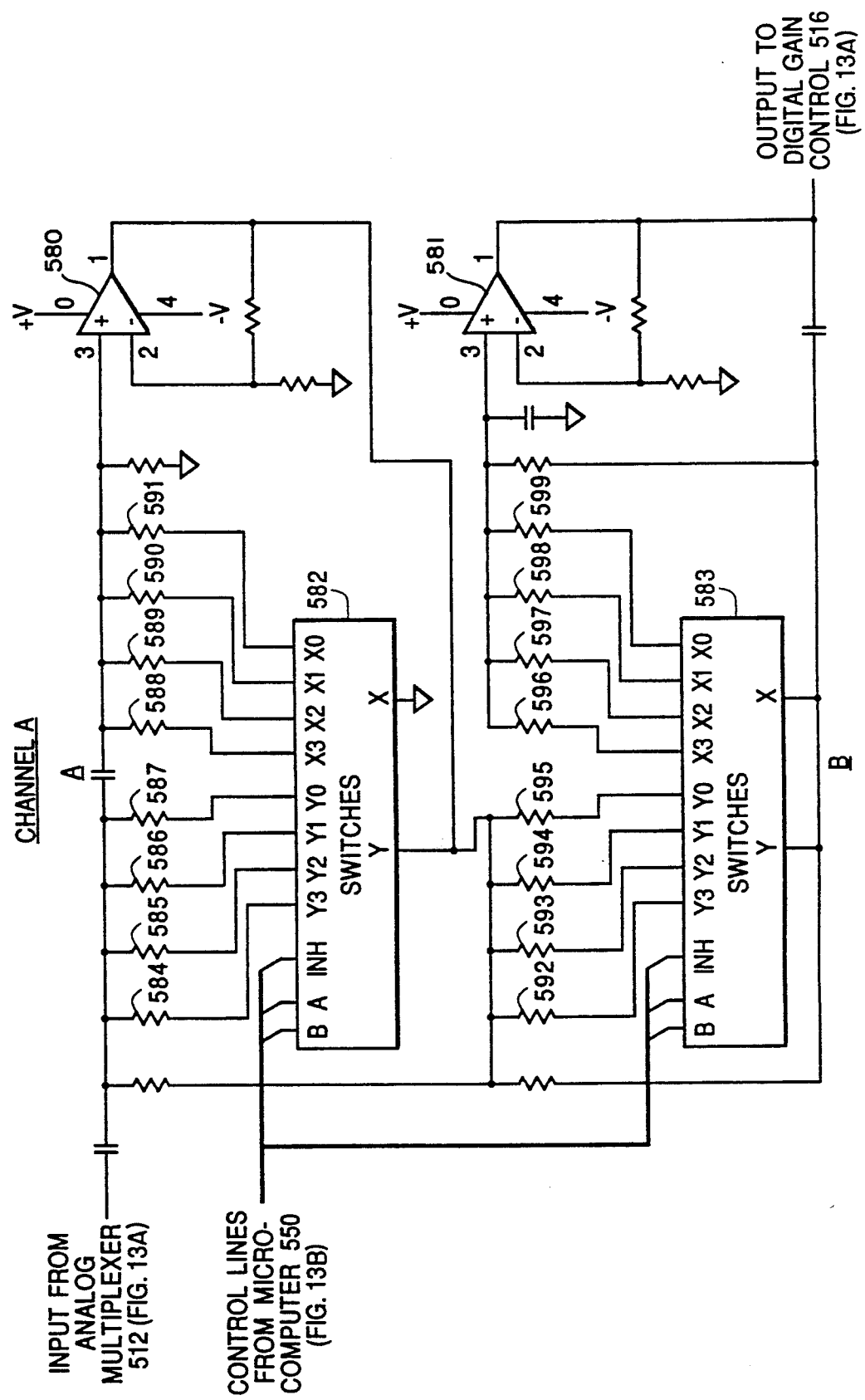
FIG. 16 is an electrical schematic diagram of one of the identical pre-filters of FIG. 13.

FIG. 16 is a schematic diagram of pre-filter 514 in FIG. 13A. The structures of pre-filters 514 and 515 are identical. Referring to FIG. 16, pre-filter 514 is designed as an adjustable, second order, active bandpass filter and may, for example, comprise an MC33172 type dual operational amplifier. Switch 582, which may, for example, comprise one section of a 4053 type triple 2-channel analog multiplexer, selects one pair of resistors from pairs of resistors 584 and 588, 585 and 589, 586 and 590, or 587 and 591. Switch 583, which may also comprise one section of a 4053 type triple 2-channel analog multiplexer, selects one pair of resistors from pairs of resistors 592 and 596, 593 and 597, 594 and 598, or 595 and 599. Thus, the bandpass of pre-filters 514 and 515 are controlled by selecting the appropriate pairs of resistors with switches 582 and 583.

Figure 18:
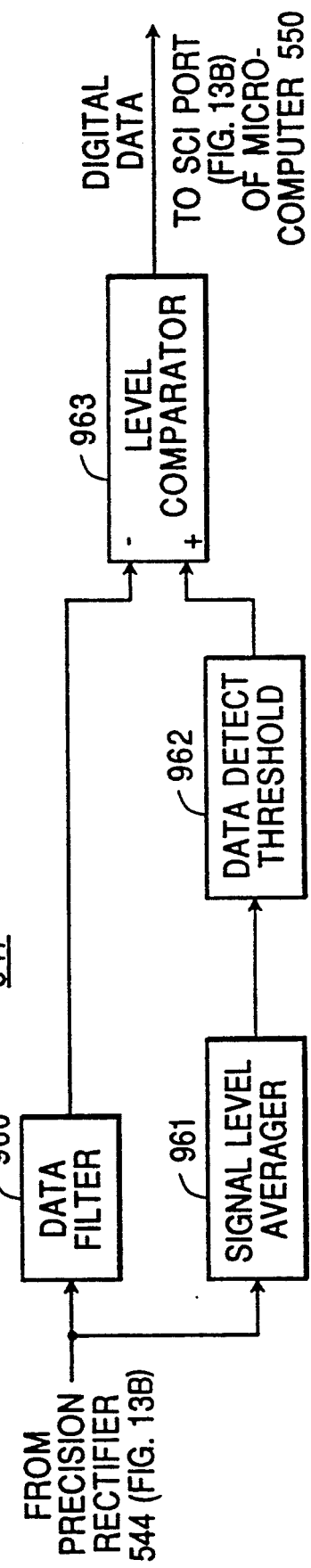
FIG. 18 is a detailed block diagram of the digital data detector of FIG. 13.

FIG. 18 is a detailed block diagram of digital data detector 547. As described above, the output of precision rectifier 544 (FIG. 13) is connected to the inputs of data filter 960 and signal level averager 961. The output of data filter 960 is connected to one input of level comparator 963. The output of signal level averager 961 is connected to the input of data detect threshold circuit 962. The output of data detect threshold circuit 962 is connected to the second input of level comparator 963. The output of level comparator 963 is connected to the SCI port of microcontroller 550 in FIG. 13B. The circuit combination of signal level averager 961 and data detect threshold circuit 962 provides a threshold voltage which is approximately 50% of the average incoming signal level from precision rectifier 544. The incoming signal from precision rectifier 544 is filtered by data filter 960, which comprises a second order, lowpass filter. Level comparator 963 quantizes the signal from data filter 960, using the threshold voltage from data detect threshold circuit 962 as a reference.

FIG. 14 is a block diagram of processor circuit 210 (FIG. 13B) including microcontroller 550 and its associated support and control circuit 551. The clock rate for microcontroller 550 is set by 4-MHz crystal 602. A signal from crystal 602 is coupled to microcontroller 550 and clock counter 604. Clock counter 604, which may, for example, comprise a 74HC4020 type 14-stage binary counter, divides the 4-MHz clock frequency to produce lower-frequency clock signals for use in the operator interface circuitry (not shown). The clock signal from clock counter 604 is coupled to operator interface buffer 605. Operator interface buffer 605 may, for example, comprise a 74HC244 type digital buffer that acts as a buffer between clock counter 605, microcontroller 550, and keypad 225 and liquid-crystal display 230. Flag port 603 may, for example, comprise a 74HC354 type multiplexer having output latches, which allows microcontroller 550 to examine the state of level detector 532 in FIG. 15. Address latch 606 may, for example, comprise a 74HC373 type latch that de-multiplexes addresses from the multiplexed address/data bus connected to microcontroller 550. The de-multiplexed addresses from latch 606 are coupled to program memory 607, which comprises a 27C128 type programmable read only memory, and also to 6116 RAM chip 609 or the working memory of microcontroller 550. (There is also a small amount of RAM in microcontroller 550 which is used to save configuration data when power is removed from the rest of the circuitry.) External address buffer 610 buffers addresses going to devices on other circuit boards in receiver 200. External data buffer 608 buffers data going to devices on other circuit boards in receiver 200.

Device macroselect 611 decodes the addresses of blocks of memory, by receiving the address information from address latch 606 and identifying a block of memory in which a location desired to be addressed is found. These memory blocks include RAM (working memory) 609 and the devices addressed by external address buffer 610. The memory blocks also include register select latches 612 and 613. Register select latch 612 decodes eight groups of 16 addresses each for control registers 614–616. Register select latch 613 decodes another eight groups of 16 addresses for control registers 614–617 and other devices in receiver 200. Each of individual control registers 614–617 are decoded with the least-significant four bits of the address bus. Control lines 1–4 are coupled to antenna tuning circuits 504–506 (FIG. 15).

Referring to FIG. 13B, microcontroller 550 controls the actions of the analog circuit by writing control bytes to control registers 614–617 (FIG. 14). The transmitted signals from transmitter 100 (FIG. 6) are detected by antennas 501, 502 and 503, which are all tuned by two bits in control register 614. A third bit in control register 614 is provided to reduce the sensitivity of antennas 501–503. A fourth bit is provided to disable the antennas. In some operating modes for receiver 200, broadband reception is desired and antennas 501–503 are tuned accordingly. In other operating modes such as, for example, an active locating mode wherein a specific frequency signal is being tracked, it is desirable to tune the receiver to that frequency and reduce the response of the receiver to other frequencies. Such locating modes are described in more detail in commonly-assigned, copending Application Ser. No. 902,525, filed Jun. 22, 1992, which is a continuation application of U.S. Ser. No. 539,616, filed Jun. 18, 1990, now abandoned entitled "An Improved System For Locating Multiple Concealed Underground Objects", which is expressly incorporated herein by reference.

Tuning of antennas 501-503 of receiver 200 increases the response to desired signals (selectivity) and decreases the response to out-of-band or interfering signals. The signal-to-noise ratio for the desired signals is also improved significantly in receiver 200, in accordance with the receiver's increased selectivity.

The frequency range of receiver 200 is divided into lower, middle and upper tuning bands, with each band covering about two octaves. When a frequency is selected by the operator, microcontroller 550 determines which band the frequency falls into, and sets either the signal CONTROL LINE 1, CONTROL LINE 2, or does not select either signal (FIG. 15). Microcontroller 550 sets the states of CONTROL LINE 1 and CONTROL LINE 2 by writing a control byte to the address of control register 614, which latches the byte in control register 614. If the bits supplied to CONTROL LINE 1 and CONTROL LINE 2 are both set low, then transistors 568 and 569 (FIG. 15) are turned off and shunt components 566, 567, 570 and 571 are disconnected from the tuning circuit. Thus, the present receiver is capable of digitally controlling the frequency response of the input antenna circuits.

For each of analog multiplexers 512 and 513 (FIG. 13A), one of the input signals is selected for a single output by writing a control byte to the address of a control register in FIG. 14. The signals coupled to the inputs of analog multiplexer 512 (channel A) are LOWER, VERTICAL, EXTERNAL and DIFFERENCE. The other inputs to channel A are connected to ground. The signals coupled to analog multiplexer 513 (channel B) are DIFFERENCE, LOWER and UPPER, with the other inputs connected to ground.

Channel A and Channel B pre-filters 514 and 515 (FIG. 16) share five common control lines (not shown) from microcontroller 550. Both are enabled or disabled by the first control line, have their upper cutoff frequency set by the second and third control line, and have their lower cutoff frequency set by the fourth and fifth control line.

Referring again to FIGS. 13A and 13B, receiver 200 utilizes the superheterodyne principle of frequency down-conversion with filtering before and after the down-conversion takes place, in order to provide high receiver performance at narrow bandwidths. Signal gain in receiver 200 is controlled by processor 564, which monitors the output signals of digital gain controls 526 and 527, and sets digital gain controls 516, 517, 526 and 527 to keep the channel signals within a range that provides good signal-to-noise ratio but avoids overloading the receiver.

DETECTION OF TRANSMITTED DIGITAL INFORMATION

When digital information is transmitted along with the carrier signal from transmitter 100 (FIG. 6), the received signal is processed through the Channel A portion of receiver 200 (FIGS. 13A and 13B) and coupled from the output of precision rectifier 544 to digital data detector 547. Digital data detector 547 converts the on and off serial sequence of information in the received signal to a serial sequence of binary logic states (1 or 0). The serial binary information is coupled to the SCI input of microcontroller 550. The SCI, in turn, converts the serial binary information into an 8-bit byte of data and supplies the 8-bit byte of data to processor 564, which checks the parity of the byte and initiates a control action depending on the type of data included in the byte.

As discussed above with respect to the transmission of category codes, the control action initiated by processor 564 for a particular received 8-bit byte depends on the type of data included in the byte. The received signal includes a recurring sequence of bytes of data, which relate to the transmission of data in the specified catagories, such as ID codes, product codes, command codes, etc. The first byte in the sequence of bytes always includes the category code for that particular sequence of bytes. Processor 564 retains in its memory the categories of data being received, and initiates actions via microcontroller 550 and its associated control circuitry to respond to the type of data received.

For example, with respect to the receiving and processing of digital information, if the received data represent angle sensor readings, microcontroller 550 alerts the operator to the presence of the new data by causing a "beep" to be supplied to speaker 240. The angle sensor readings are then displayed at LCD 230 (FIG. 6). If the received data represent an ID code, microcontroller 550 initiates another "beep" at speaker 240, the letters "ID" are displayed on the alphanumeric display of LCD 230, and the specific ID number received is displayed on the LCD's numeric display. If the received data represent a product code, microcontroller 550 configures receiver 200 to the operating mode designated for that product code. Finally, if the received data represent a command code, processor 564 causes receiver 200 to respond in accordance with the action required by the command.

DETECTION OF TRANSMITTED ANALOG INFORMATION

With respect to the receiving and processing of analog information, if a command code is received that directs receiver 200 to configure from a normal (tracing) mode to an analog reception mode of operation, processor 564 supplies control signals to control the bandwidths of the digitally tuned filters in FIG. 13A, so that those filters will pass audio frequencies. Additionally, switch 545 is positioned to pass the signal from the output of precision rectifier 542 to audio circuit 543. The output of audio circuit 543 is coupled to speaker 240 (FIG. 6). Conversely, if a command code is received that directs receiver 200 to reconfigure from analog reception to a tracing mode of operation, processor 564 supplies control signals that reconfigures the digitally tuned filters to provide their original bandwidths (prior to analog reception), and positions switch 545 to open in order to supply the signal at the output of precision rectifier 542 to the input of signal averaging circuit 546. It is again noted that the specific manner in which the receiver provides data to the LCD and the speaker is not critical to the understanding of this invention. For the present invention, any well known technique may be used with a microcontroller for controlling the display of information at an LCD or providing an audible sound at a speaker, in response to data processed in a microprocessor. However, a specific technique using a microcontroller to control the display of data at an LCD and providing an audible signal at a speaker in a locator receiver, is disclosed in commonly assigned, copending Application Ser. No. 539,552 filed Jun. 18, 1990, entitled "Locator Transmitter Having Automatically Tuned Antenna", which is expressly incorporated herein by reference.

AN IMPROVED LOCATOR TRANSMITTER FOR SIMULTANEOUSLY TRANSMITTING MULTIPLE ID CODES

Figure 9:
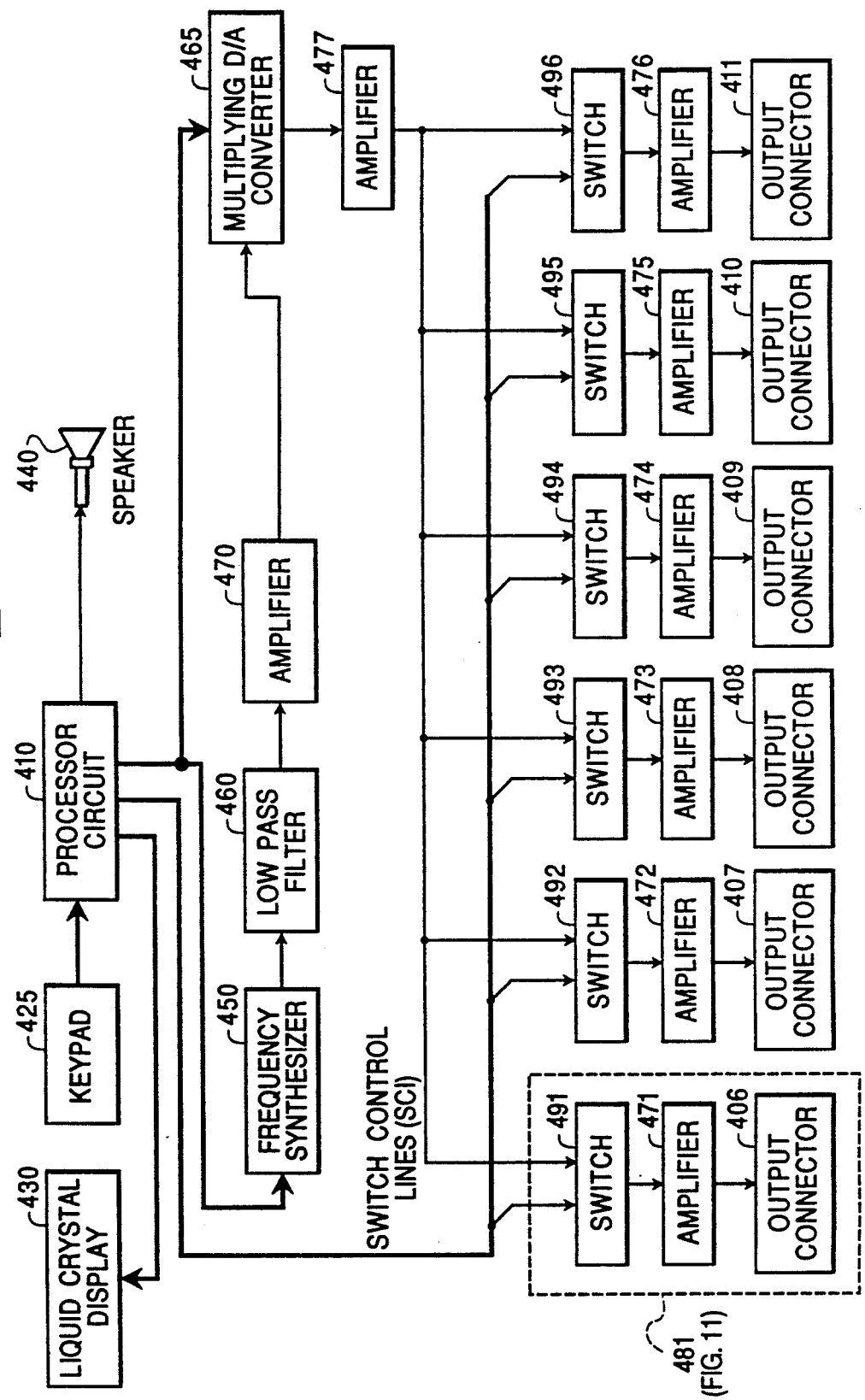
FIG. 9 is an electrical block schematic diagram of a multiple-output locator transmitter in accordance with a second embodiment of the present invention.

FIG. 9 illustrates a simplified electrical block diagram of an improved locator transmitter in accordance with another embodiment of the present invention, which includes a plurality of output connectors that may be simultaneously connected to a plurality of different lines. Transmitter 40, which may be substituted for transmitter 100 in this embodiment, includes processor circuit 410, which coordinates and controls all functions of transmitter 40. The transmitter operator (not shown) inputs commands to transmitter 40 using keypad 425. Transmitter 40 communicates information back to the operator using liquid-crystal display 430 and speaker 440. The signal to be transmitted by transmitter 40 is generated by frequency synthesizer 450, filtered by digitally controlled filter 460, and buffered by buffer amplifier 470, which may, for example, comprise one section of a TLC27L2 type dual operational amplifier. The output of amplifier 470 is supplied as a reference voltage to one channel of D/A converter 465, which may, for example, comprise a TLC7528 type dual multiplying D/A converter. Processor circuit 410 utilizes D/A converter 465 to control the amplitude of the output signals, as disclosed below. The output signal from D/A converter 465 is buffered by amplifier 477, which may, for example, comprise one section of a TLC27L2 type dual operational amplifier. The output of amplifier 477 is coupled to six separate sets of output circuits, comprising switches 491-496, amplifiers 471-476, and output connectors 406-411, respectively.

Figure 10:
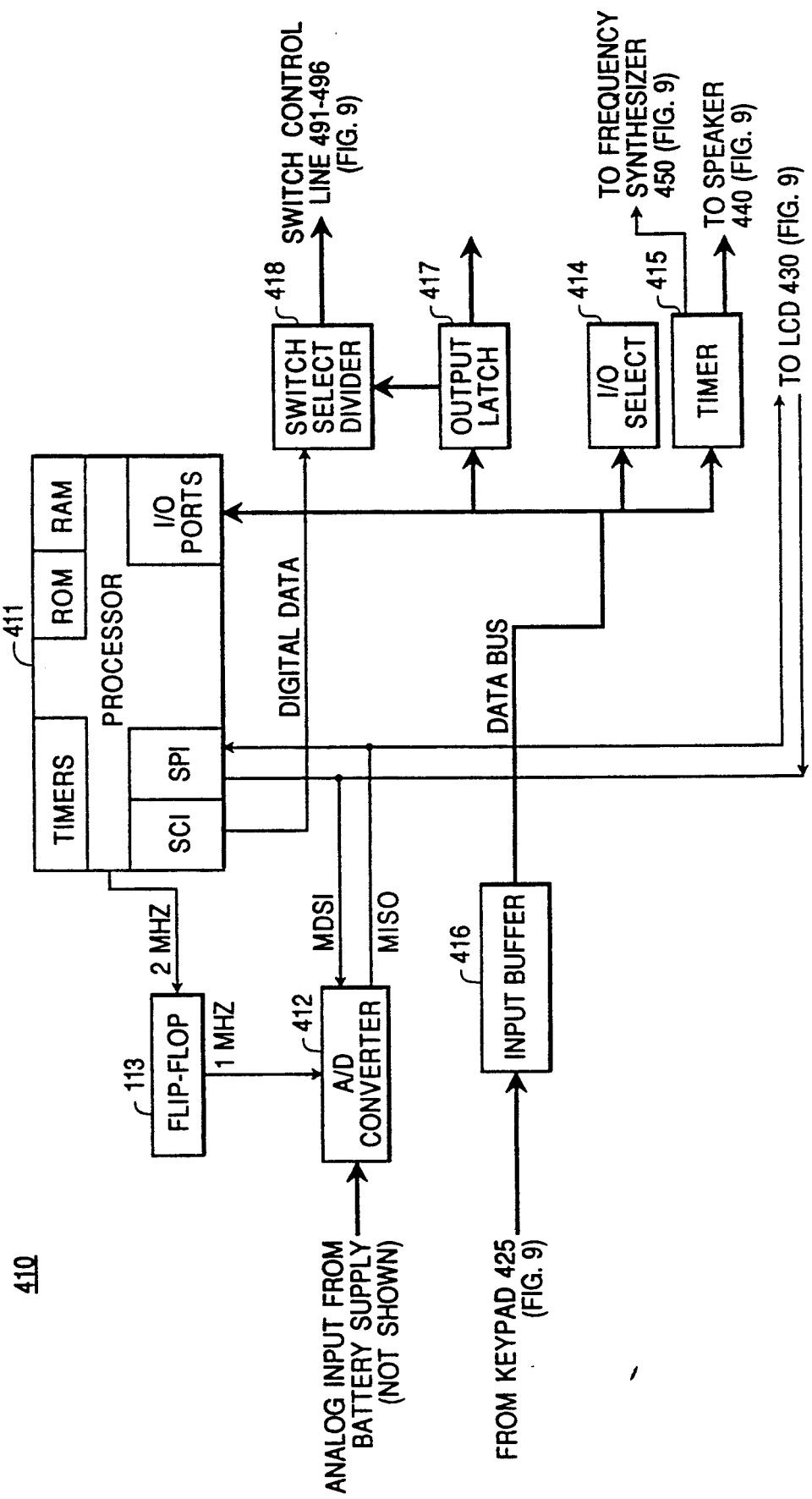
FIG. 10 is an electrical block schematic diagram of the processor circuit of FIG. 9.

The detailed structure of processor circuit 410 is shown in FIG. 10. Referring to FIGS. 9 and 10, microcontroller 411 may, for example, comprise a Motorola MC68HC705C8 type microcontroller including a processor, ROM, RAM, an asynchronous bidirectional SCI integral with a baud rate generator, a synchronous bidirectional SPI, a timer system, and input-output ports (I/O ports). A/D converter 412, which may, for example, comprise a 45040 type 8-bit A/D converter, is coupled to microcontroller 411 through the microcontroller's bidirectional SPI. The 1-MHz clock signal for A/D converter 412 is provided by flip-flop 413, which divides the microcontroller's crystal-controlled clock frequency of 2 MHz in half. I/O select 414, which may, for example, comprise a 74HC138 type 1-of-8 decoder, generates input/output select signals from three of the microcontroller's I/O port lines. Programmable timer 415, which may, for example, comprise an 82C54 type programmable timer, generates a reference frequency signal for frequency synthesizer 450. Input buffer 416 provides an interface between keypad 125 and the data bus in processor circuit 410. Output latch 417, which may, for example, comprise a 74HC374 type latch, latches command bytes from microcontroller 411 provided through the data bus, in order to control output switches 491-496 in FIG. 9. An output signal (digital data) from the SCI is coupled to one of the low-active enable inputs of switch select decoder 418. Also, three bits of output latch 417 are coupled to the address inputs of switch select decoder 418, in order to route the serial data input to one of the six switch control lines in FIG. 9. Each switch control line is connected to a respective one of switches 491-496 in FIG. 9. Programming of liquid-crystal display 430 (FIG. 9) is accomplished by microcontroller 411 via the MISO and MOSI serial data lines from the SPI port.

Figure 11:
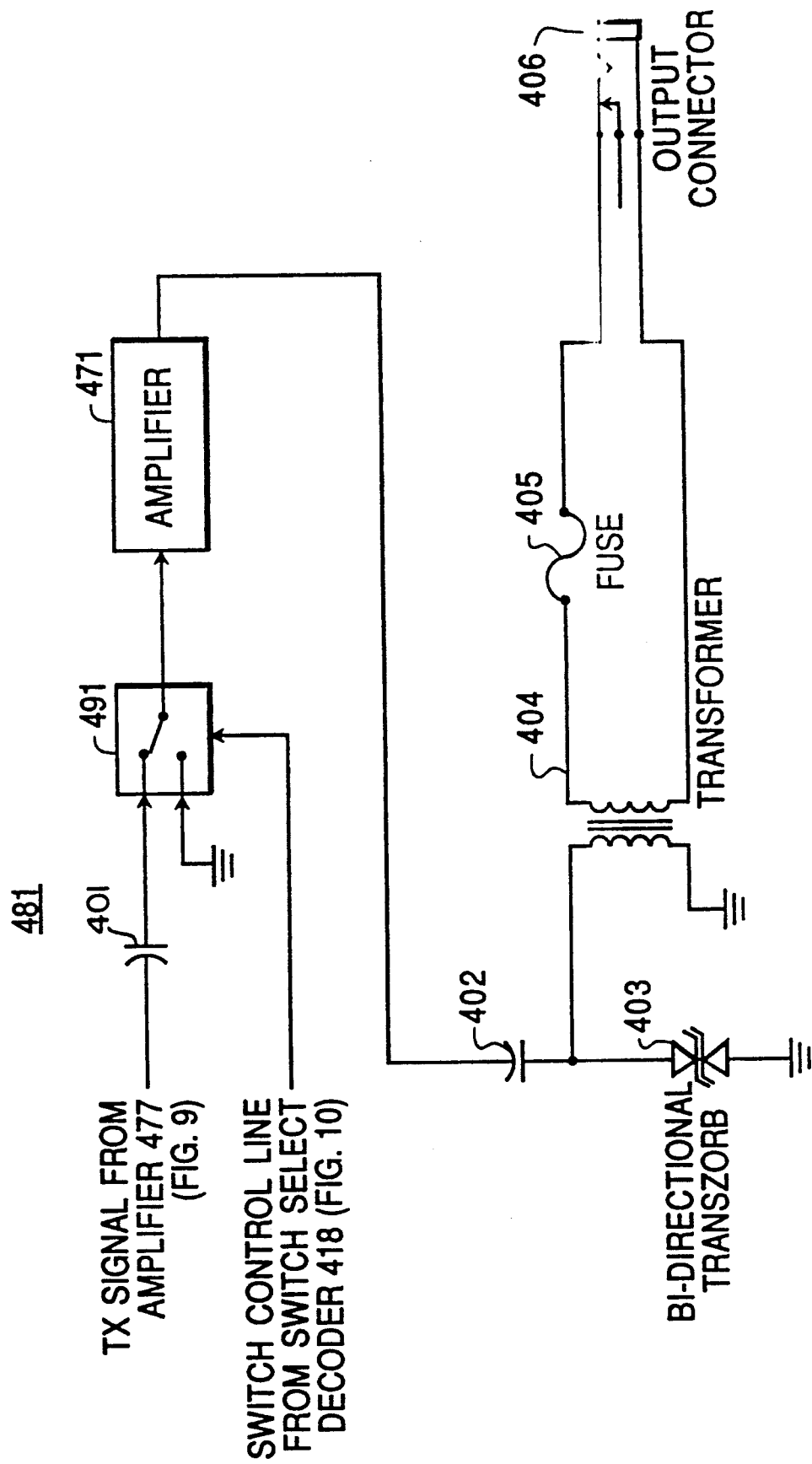
FIG. 11 is an electrical block schematic diagram of one of the identical output circuits of FIG. 9.

For illustrative purposes, the detailed structure of only one of the six identical sets of output circuits (circuit 481) of FIG. 10, is shown in FIG. 11. Referring to FIG. 11, input TX SIGNAL from amplifier 477 is coupled by capacitor 401 to one input of analog switch 491, which may, for example, comprise one section of a 4053 triple 2-channel analog multiplexer. The other input to analog switch 491 is connected to ground. The output of switch 491 is coupled to amplifier 471, which may, for example, comprise an LM388 type power amplifier. The output of amplifier 471 is coupled by capacitor 402 to transformer 404, which is arranged with bidirectional transient absorber (tranzorb) device 403 across the input winding. Bidirectional tranzorb device 403 may, for example, comprise a P6KE16CA type bidirectional transient absorber. The output of transformer 404 is coupled through fuse 405 to output connector 406 in output circuit 481.

In an operation similar to that disclosed with respect to the single output transmitter illustrated in FIG. 6, microcontroller 411 programs D/A converter 465 (FIG. 9) to set an appropriate output signal level. Frequency synthesizer 450 determines the basic frequency of the carrier signal to be transmitted. The output signal from frequency synthesizer 450, which is a square-wave, is coupled to low pass filter 460. Filter 460 removes the harmonics from the square-wave signal and produces a relatively pure, sine-wave output signal.

In order to distinguish between each of the six output signals, microcontroller 411 encodes each signal at respective output connectors 406-411 with a different digital ID code. Microcontroller 411 programs the internal SCI with the correct data format, baud rate, etc. The different ID codes to be transmitted are then coupled to each of output connectors 406-411 in a rotational sequence. In other words, one ID code is coupled to output connector 406, then a second ID code is coupled to output connector 407, and so on. The sequence of ID codes is then repeated for each of the respective output circuits.

To further illustrate one step in the rotational sequence of transmitting ID codes, microcontroller 411 writes a control byte to the address of output latch 417 (FIG. 10). Three bits from output latch 417 are coupled to the address inputs of switch select decoder 418. Switch select decoder 418 selects the appropriate output switch which, in the above-described example, is switch 491. Microcontroller 411 then loads an ID code into the SCI. When the output of the SCI goes low (a logic "one") for the start bit of the ID code, switch select decoder 418 supplies a control signal to switch 491 that connects the input of switch 491 to ground. Conversely, when the output of the SCI goes high (a logic "zero"), the position of switch 491 is set to pass the TX SIGNAL to amplifier 471 and then on to output connector 406. Thus, the position of switch 491 is controlled by the output bit pattern from the SCI, which serves to interrupt or encode the output signal for each addressed output circuit.

AN IMPROVED SUBTERRANEAN TRANSMITTER

Figure 12:
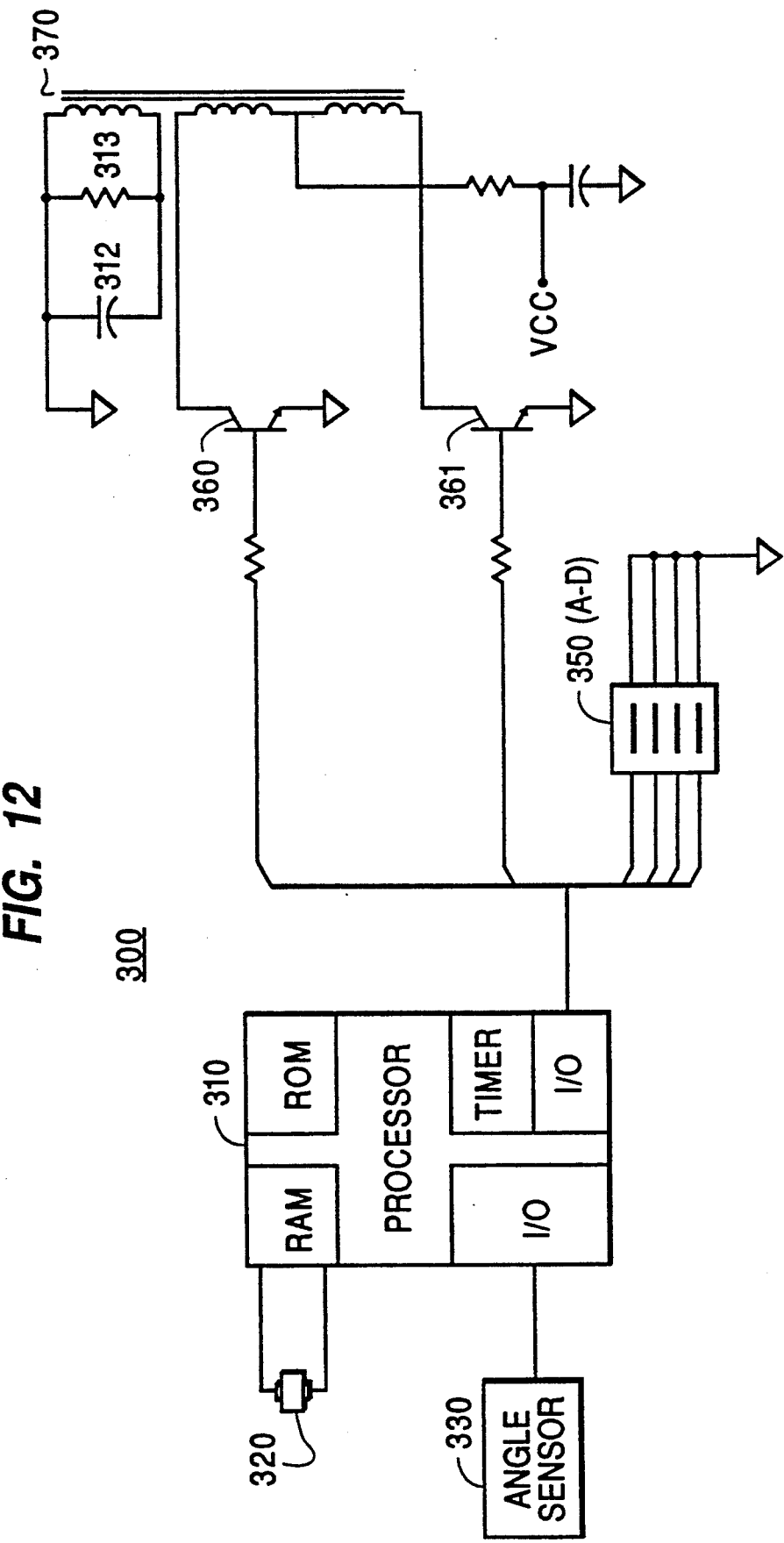
FIG. 12 is an electrical block schematic diagram of an improved subterranean transmitter which also may be used with the receiver shown in FIG. 6.

FIG. 12 illustrates an electrical block diagram of a subterranean transmitter in accordance with another embodiment of the present invention. Transmitter 300 includes microcontroller 310, which may, for example, comprise an MC68HC705C8 type microcontroller which further includes a processor, ROM, RAM, a timer system, and input-output ports (I/O ports) on a single semiconductor chip. Microcontroller 310 coordinates and controls all functions of transmitter 300. Crystal 320 determines the clock rate of microcontroller 310. Angle sensor 330 measures the roll or pitch angles of a boring tool in which transmitter 300 is mounted. The specific structure and operation of new, improved angle sensors for mounting in a boring tool, are disclosed and claimed in commonly-assigned, copending applications Ser. No. 539,551, filed Jun. 18, 1990, now issued into U.S. Pat. No. 5,133,417, entitled "Angle Sensor Using Thermal Conductivity For A Steerable Boring Tool", and Ser. No. 837,110, filed Feb. 18, 1992, which is a continuation application of U.S. Ser. No. 539,699, filed Jun. 18, 1990, now abandoned, entitled "Angle Sensor For A Steerable Boring Tool", which are both expressly incorporated herein by reference. The signal to be transmitted by transmitter 300 is generated by microcontroller 310, which turns output driver transistors 360 and 361 on and off in a particular sequence, producing currents in alternating directions in antenna 370. A tank circuit is provided, comprising capacitor 312, resistor 313 and the winding of antenna coil 370 between connections 1 and 2, which components determine the resonant frequency of that tank circuit. Resistor 313 determines the Q of the tank circuit. Switches 350a–d are read by microcontroller 310, in order to determine the desired operating mode for transmitter 30.

When power is applied to the circuitry of transmitter 300 (i.e., the batteries are installed), microcontroller 310 begins executing the program stored in its internal ROM. Microcontroller 310 reads the positions of switches 350a–d to determine which operating mode and transmitting frequency should be used (i.e., to transmit an ID code or transmit a particular frequency signal). The carrier signal to be transmitted by transmitter 300 is generated by microcontroller 310, which alternately turns driver transistors 360 and 361 on and off at a rate governed by the microcontroller's sequence of program instructions and the frequency of crystal 320. More than one frequency can be transmitted selectively depending upon the particular sequence of program instructions used, provided the antenna is returned for the new frequency.

At predetermined intervals determined by the internal timer system of microcontroller 310 (typically one second), the angular (roll and/or pitch) position of angle sensor 330 is determined and the angular data are encoded on the transmitted signal by interrupting the signal (i.e., a binary on or off signal pattern), causing an amplitude modulated encoding of the digital information. The digital encoding scheme data protocol used is that described above with respect to category codes. In addition to transmitting angle sensor information, transmitter 300 may also transmit other digital information such as ID codes, product codes, electric field intensities, and shock and vibration data, depending upon the setting of switches 350a–d.

This invention has been described in detail in connection with the preferred embodiments but is for illustrative purposes only and the invention is not limited thereto. It will be easily understood by those skilled in the art that variations and modifications can easily be made within the scope of this invention as defined by the appended claims.

What is claimed is:

1. A locator system for use in locating a fixed object permanently buried underground by detecting an electromagnetic field radiated from said fixed object, and receiving and processing communication information provided over said radiated electromagnetic field, said system comprising:
   a generator for generating electrical energy adapted for locating said fixed object when radiated therefrom;
   means for encoding a sequence of digital bits comprising digital data on said electrical energy;
   means for coupling the electrical energy encoded with said digital data to said fixed object so that said fixed object radiates an encoded electromagnetic field;
   means for detecting said radiated electromagnetic field including said encoded digital data at a location remote from said underground object; and
   means for receiving and processing said encoded digital data received with said electromagnetic field detected at said remote location so that locating of said fixed object and communication of said encoded digital data can be carried out by said locator system.

2. The locator system according to claim 1 further including a circuit for providing operating status information concerning the locator system, wherein said operating status information defines said communication information.

3. The locator system according to claim 1 wherein said digital data comprises transmitter signal identification data.

4. The locator system according to claim 1 further including in said locator system prestored data identifying the locator system, and wherein said digital data comprises transmitter product identification data.

5. The locator system according to claim 1 wherein said digital data comprises receiver configuration command data.

6. The locator system according to claim 1 wherein a receiver of said locator system is responsive to said encoded digital to change a filter bandwidth from a narrow bandwidth to a wide bandwidth for receiving an analog signal.

7. The locator system according to claim 6 wherein said analog signal comprises an audio frequency signal.

8. A locator system for use in locating an underground object wherein communication information is modulated on an electromagnetic locating field radiated from said underground object, said system comprising:
   multi-frequency signal generator means capable of generating a plurality of signals of different frequencies;
   frequency selector means for selecting a signal from the plurality of signals generated by the multi-frequency signal generator means;
   transmitting means for transmitting said selected signal to the underground object so that said underground object radiates an electromagnetic field and on detection thereof the underground object can be located;

output coupling means of said locator system for coupling said selected frequency signal to an output of said transmitting means;

output control means coupled to said output of said transmitting means for selectively controlling the electrical characteristics of said selected frequency signal so that communication information can be combined with said electromagnetic locating field;

modulating means coupled to said transmitting means for modulating said communication information onto said selected frequency signal;

radiating means coupled to said output of said transmitting means for radiating said modulated frequency signal;

sensing means for sensing the modulated signal radiated from said radiating means, said sensing means producing a second signal representative of the sensed radiated signal;

amplifying means coupled to said sensing means for amplifying said second signal from said sensing means;

gain control means coupled to said amplifying means for controlling the gain of said amplified second signal;

signal converter means coupled to an output of said amplifying means for converting said amplified second signal to an intermediate frequency signal; and detecting means for removing said communication information from said intermediate frequency signal.

9. The locator system according to claim 8 wherein said multi-frequency signal generator means comprises a frequency synthesizer.

10. The locator system according to claim 8 wherein said frequency selector means comprises a digitally controlled switch.

11. The locator system according to claim 8 wherein said gain control means comprises a digital gain control.

12. The locator system according to claim 8 wherein said electrical characteristic comprises signal power.

13. The locator system according to claim 8 wherein said communication information comprises a sequence of digital words.

14. The locator system according to claim 8 wherein said communication information comprises an analog signal.

15. The locator system according to claim 14 wherein said analog signal comprises an audio frequency signal.

16. The locator system according to claim 8 further including a circuit for providing sensor related data for said locator system, wherein said sensor related data defines said communication information.

17. A method for use in locating an underground object by detecting a narrow band electromagnetic field radiated from said object for locating purposes, and for use in receiving and processing wide band information provided over the radiated electromagnetic field for communication purposes, said method comprising the steps of:

generating an electromagnetic field for driving the underground object with electrical energy;

encoding wide band information on said electromagnetic field to communicate the encoded information to a remote location;

encoding on the electromagnetic field a code used by a locator-receiver to switch from narrow band operation to wide band operation;

causing the underground object to radiate the electromagnetic field encoded with the code for reception by the locator-receiver;

switching locator-receiver circuits from narrow band operation to wide band operation;

radiating said electromagnetic field and said encoded wide band information, from said underground object;

receiving said radiated electromagnetic field and said encoded wide band information at the remote location so that wide band communication can be carried out; and detecting and processing said encoded wide band information provided over said electromagnetic field at said remote location.

18. The method according to claim 17 wherein said encoded information comprises a sequence of digital words.

19. The method according to claim 17 wherein said encoded information comprises an analog signal.

20. The method according to claim 19 wherein said analog signal comprises an audio frequency voice signal.

21. A method for use in locating the path of an object fixed underground wherein information is impressed on an electromagnetic field radiated from said underground object, the method comprising the steps of:

generating one of a plurality of different frequencies capable of being generated by a transmitter;

coupling said generated frequency to an output of the transmitter;

selectively controlling the power by which the generated frequency is transmitted by said transmitter;

modulating said information onto said generated frequency;

coupling said modulated frequency from said output of said transmitter to said fixed underground object;

radiating said modulated frequency from said fixed underground object;

moving a receiver of the radiated and modulated frequency on the surface of the ground to locate the path taken by the fixed underground object;

sensing the radiated and modulated frequency and producing a second signal representing said sensed radiated frequency;

amplifying said second signal;

controlling the gain of said amplified second signal;

converting said amplified second signal to an intermediate frequency signal; and demodulating the modulated frequency to remove said information from said intermediate frequency signal.

22. The method according to claim 21 wherein said information comprises a sequence of digital words.

23. The method according to claim 21 wherein said information comprises an analog signal.

24. The method according to claim 23 wherein said analog signal comprises an audio frequency signal.

25. A method for use in locating the path of an object fixed underground, wherein information is impressed on an electromagnetic field radiated from said underground object, the method comprising the steps of:

generating a subset of different frequencies from a first plurality of different available frequencies;

coupling each frequency of said subset to a different output of a transmitter having a plurality of outputs;

modulating said information onto said subset of frequencies;

radiating at least one of said modulated frequencies from said underground object;

sensing said at least one of the radiated frequencies and producing a second signal representing said sensed radiated frequency;

amplifying said second signal;

controlling the gain of said amplified second signal;

converting said amplified second signal to an intermediate frequency signal; and removing said information from said intermediate frequency signal.

26. A transmitter for use in a system for locating an object fixed underground, and wherein information is impressed on an electromagnetic field radiated from the underground object, said transmitter comprising:

a programmable multi-frequency signal generator adapted for generating a plurality of signals of different frequencies;

programming means for programming the signal generator to generate at least a first signal from the plurality of signals;

transmitting means receiving the signal generated by the signal generator for transmitting said generated signal;

coupling means for coupling said generated signal from the signal generator to said transmitting means;

modulating means coupled to said transmitting means for modulating said information onto said selected generated signal; and transmitter output means coupled to said output of said transmitting means for coupling the modulated and transmitted signal to said underground fixed object.

27. A receiver for use in a system for locating an underground object, wherein information is modulated on a carrier signal radiated from said underground object as an electromagnetic field, said receiver comprising:

means for sensing a carrier frequency of the radiated electromagnetic field and distinguishing the carrier frequency from other carrier frequencies receivable by the receiver;

detecting means for detecting the sensed carrier frequency and information modulated on the sensed carrier frequency and for producing a signal representing said detected sensed carrier frequency;

amplifying means coupled to said detecting means for amplifying said detected carrier frequency;

gain control means coupled to said amplifying means for controlling the gain of said amplifying means based on the amplitude of the detected carrier frequency;

signal converter means coupled to an output of said amplifying means and responsive to the means for detecting a carrier frequency for converting said amplified detected carrier frequency to an intermediate frequency signal; and means for demodulating said modulated information from said intermediate frequency amplified signal.

28. A method for use with a transmitter for locating an underground object wherein information is modulated on a carrier frequency that is radiated from said underground object as an electromagnetic field, said method comprising the steps of:

generating a carrier frequency signal with a multi-frequency generator;

modulating the carrier frequency signal at one time with a digital signal to condition a locator receiver to operate compatibly with the transmitter, and modulating the carrier frequency signal at a different time with an analog signal;

coupling said modulated carrier frequency signal to said transmitter;

coupling said modulated carrier frequency signal from said output of said transmitter to said underground object with an output coupler; and radiating said modulated carrier frequency signal from said underground object as the electromagnetic field.

29. A method for use with a receiver for locating an underground object, wherein information is modulated on a carrier signal and radiated from said underground object as an electromagnetic signal, said method comprising the steps of:

detecting the electromagnetic signal and the information modulated thereon as radiated from said underground object and producing a detected signal representing said detected modulated carrier signal;

amplifying said detected modulated carrier signal;

controlling the amplitude of said amplified detected modulated carrier signal;

converting said amplified detected modulated carrier signal to an intermediate frequency signal; and removing the modulated information from said intermediate frequency signal and processing the removed modulated information to activate receiver circuits in response thereto.

30. A locator system for use in locating an underground object, comprising:

a transmitter for transmitting an electromagnetic signal to the underground object and receiver means for receiving said electromagnetic signal radiated from the underground object to determine a location of the underground object;

means in the transmitter for generating data signals identifying a type of said transmitter;

said transmitter transmitting said data signals so as to be coupled through the underground object and radiated as electromagnetic data energy therefrom; and means in said receiver means for receiving said electromagnetic data energy and extracting said data signals, and means responsive to the data signals for reconfiguring circuits of the receiver means so that the receiver means functions compatibly with the transmitter in receiving the radiated electromagnetic signal and locating said underground object.

31. The locator system according to claim 30 wherein said identification data identifies the underground object being located.

32. The locator system according to claim 30 wherein said identification data identifies the type of transmitter from which the identification data originated.

33. The locator system according to claim 32 wherein said receiving means includes means responsive to said identification data, for reconfiguring the receiver to operate with the identified type of transmitter.

34. The method of claim 26, further including generating a frequency with a frequency synthesizer for tuning a filter to detect said carrier frequency, and generating a frequency by said frequency synthesizer for use in down converting the carrier frequency to a lower frequency.

35. The locator system according to claim 30, further including in combination a subterranean boring device having incorporated therein said transmitter.

36. The method of claim 17, further including radiating the encoded electromagnetic field from an antenna of a subterranean transmitter located in a boring device.

37. The receiver of claim 27, wherein said detector detects one of a plurality of different carrier frequencies by being digitally tuned by a frequency synthesizer, said frequency synthesizer also generating a frequency for use by said signal converter for down converting said carrier frequency to a lower frequency.

38. The method of claim 28, further including radiating the modulated carrier frequency from an antenna of a subterranean transmitter located in a boring device.

39. A locator system for use in locating an underground object wherein communication information is impressed on an electromagnetic field radiated from said underground object, said system comprising:
  a transmitter, including:
    multi-frequency signal generator means for generating a first plurality of signals of different carrier frequencies;
    signal selector means for selecting a second plurality of signals from said first plurality of signals generated by the multi-frequency signal generator means;
    transmitting means for transmitting said selected second plurality of signals;
    output coupling means for coupling each signal of said selected second plurality of signals from the signal selector means to a different output of a plurality of outputs of said transmitting means;
    output control means coupled to said plurality of outputs of said transmitting means for selectively controlling electrical characteristics of said selected output signals;
    modulating means coupled to said transmitting means for modulating said communication information onto said selected second plurality of signals;
    coupling means coupled to at least one of said plurality of outputs of said transmitting means for coupling at least one of said modulated signals to said underground object so that said underground object radiates an electromagnetic field for location purposes and radiates said communication information for communication purposes;
  a receiver, including,
    sensing means for sensing at least one of the radiated signals radiated from said underground object and producing a second signal representing said sensed radiated signal;
    amplifying means coupled to said sensing means for amplifying said second signal from said sensing means;
    gain control means coupled to said amplifying means for controlling the gain of said amplified second signal;
    signal converter means coupled to an output of said amplifying means for converting said amplified second signal to an intermediate frequency signal; and
    detecting means for removing said communication information from said intermediate frequency signal.

40. A method of providing communications from a transmitter transmitting a carrier to an underground conductor, to a locator receiver receiving an electromagnetic carrier radiated from the underground conductor, said method comprising the steps of:
  modulating by the transmitter communication information on the carrier and coupling the modulated carrier to the underground conductor for radiation of a corresponding modulated electromagnetic carrier;
  said modulation being carried out by modulating the carrier with a multi-bit word where different bit configurations of the word represent different communication information transmitted to the receiver via the underground conductor; and
  demodulating the multi-bit word by the receiver and decoding the bits of the multi-bit word to determine an action to be taken by the locator receiver.

41. The method of claim 40, further including modulating a multi-bit command code on the carrier; and
  decoding the multi-bit command code by the locator receiver and reconfiguring the locator receiver from one mode of operation to a different mode of operation.

42. The method of claim 41, wherein said reconfiguring step comprises changing the locator receiver from a mode for locating an underground conductor to a mode for communicating audio signals from the transmitter to the locator receiver.

43. The method of claim 41, wherein said reconfiguring step comprises displaying on a visual display an identification of a carrier frequency transmitted by the transmitter so that receiver circuits can be reconfigured for receiving the carrier frequency identified.

44. The method of claim 40, further including decoding a multi-bit word having N+M bits, wherein an N-bit portion of the word identifies a function to be carried out by an M-bit portion of the word.

45. The method of claim 44, further including decoding the N-bits into plural different categories of information processed by the locator receiver.

46. The method of claim 45, further including decoding the M-bits to define a product code identifying a particular type of transmitter transmitting signals received by the locator receiver.

47. The method of claim 45, further including decoding the M-bits to define an identification code for identifying different transmitters of signals receivable by the locator receiver.

48. The method of claim 45, further including decoding the M-bits to define an angular orientation of an underground boring tool.

49. The method of claim 45, further including decoding the M-bits to define an electric field strength of a signal transmitted.

50. The method of claim 45, further including decoding the M-bits to define a boring tool temperature.

51. The method of claim 45, further including decoding the M-bits to define a mode of locator receiver operation, and reconfiguring the locator receiver to operate in a manner compatible with a particular type of transmitter transmitting the signal to the underground conductor.

* * * * *